(12) United States Patent
Bernard et al.

(10) Patent No.: US 6,782,993 B2
(45) Date of Patent: Aug. 31, 2004

(54) MOBILE CONVEYOR SYSTEM AND METHOD FOR MULTIPLE LIFT STACKING

(75) Inventors: George M. Bernard, Chula Vista, CA (US); Ronald R. Kelly, Poway, CA (US)

(73) Assignee: Terra Nova Technologies, Inc., Santee, CA (US)

( * ) Notice: Subject to any disclaimer, the term of this patent is extended or adjusted under 35 U.S.C. 154(b) by 33 days.

(21) Appl. No.: 10/058,949

(22) Filed: Jan. 28, 2002

(65) Prior Publication Data

US 2003/0136632 A1 Jul. 24, 2003

(51) Int. Cl.[7] .............................................. B65G 41/00
(52) U.S. Cl. ...................... 198/585; 198/300; 198/311; 198/588; 198/594
(58) Field of Search ................. 198/585, 508, 198/588, 594, 300, 311, 314, 315, 317; 414/133

(56) References Cited

U.S. PATENT DOCUMENTS

| | | | |
|---|---|---|---|
| 1,550,250 A | * 8/1925 | Hackett ..................... 198/508 |
| 2,748,918 A | * 6/1956 | Mercier ..................... 198/585 |
| 3,391,652 A | 7/1968 | Lauber |
| 3,648,617 A | 3/1972 | Metzner et al. |
| 3,744,615 A | * 7/1973 | Plaquet et al. ............. 198/300 |
| 3,791,491 A | 2/1974 | Tickle |
| 3,877,855 A | 4/1975 | Hanson |
| RE29,110 E | * 1/1977 | Oury ......................... 198/314 |
| 4,038,764 A | 8/1977 | Hanson |
| 4,106,226 A | 8/1978 | Hanson |
| 4,206,840 A | 6/1980 | Hanson |
| 4,301,910 A | * 11/1981 | Price ......................... 198/304 |
| 4,319,677 A | * 3/1982 | Kipper ....................... 198/585 |
| 4,345,680 A | * 8/1982 | Kay ........................... 198/304 |
| 4,624,357 A | * 11/1986 | Oury et al. ................ 198/313 |
| 4,694,948 A | * 9/1987 | Ceylan ...................... 198/311 |
| 4,776,449 A | * 10/1988 | Hoffmann et al. ......... 198/508 |
| 4,813,526 A | * 3/1989 | Belanger ................... 198/313 |
| 4,924,993 A | * 5/1990 | Buxton ...................... 198/311 |
| 4,934,761 A | 6/1990 | Sauvageot et al. |
| 4,981,204 A | * 1/1991 | Smith ........................ 198/313 |
| 5,112,111 A | * 5/1992 | Addington et al. ........ 198/594 |
| 5,119,734 A | 6/1992 | Schwarzkopf |
| 5,203,442 A | * 4/1993 | Oury et al. ................ 198/313 |
| 5,234,094 A | * 8/1993 | Weyermann et al. ...... 198/588 |
| 5,402,874 A | * 4/1995 | Dahlin et al. .............. 198/300 |
| 5,404,988 A | * 4/1995 | Konigs ...................... 198/588 |
| 5,499,899 A | * 3/1996 | Hibbs ........................ 198/313 |
| 5,634,545 A | * 6/1997 | Plumley .................... 198/303 |
| 5,749,452 A | 5/1998 | Kanenwischer |
| 5,819,950 A | * 10/1998 | McCloskey ................ 198/318 |
| 6,085,890 A | * 7/2000 | Kelly et al. ................ 198/303 |

FOREIGN PATENT DOCUMENTS

| | | | | |
|---|---|---|---|---|
| BE | 513512 | * | 4/1954 | ................. 198/508 |
| DE | 745216 | * | 3/1944 | ................. 198/508 |
| DE | 244111 | * | 3/1987 | ................. 198/300 |
| GB | 2179617 A | * | 3/1987 | ................. 198/311 |

* cited by examiner

*Primary Examiner*—Douglas Hess

(57) ABSTRACT

Mobile conveyor modules are used for transporting aggregate over a long distance, or for transferring the aggregate to other modules, and for stacking the aggregate either linearly or radially. These modules may be used in various combinations by themselves or in combination with existing conveyor systems and bridge stackers to stack aggregate on and off multi-lift leach pads and on multi-lift dump sites. The mobile conveyor modules are designed to be steerable and self-propelled, providing increased maneuverability and reducing relocation/reformation time. Multiple stacking methods may be used with the mobile conveyor modules either separately, or at the same time, advance and retreat stacking, the stacking of a berm, or the filling in of a corridor, may be accomplished on a variety of terrain.

33 Claims, 23 Drawing Sheets

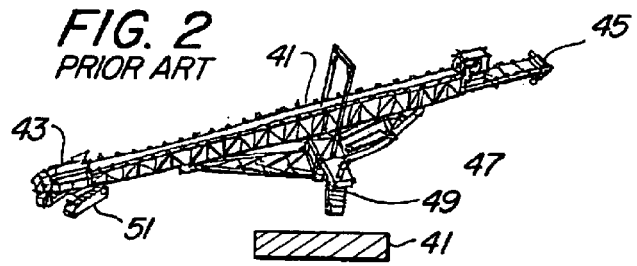
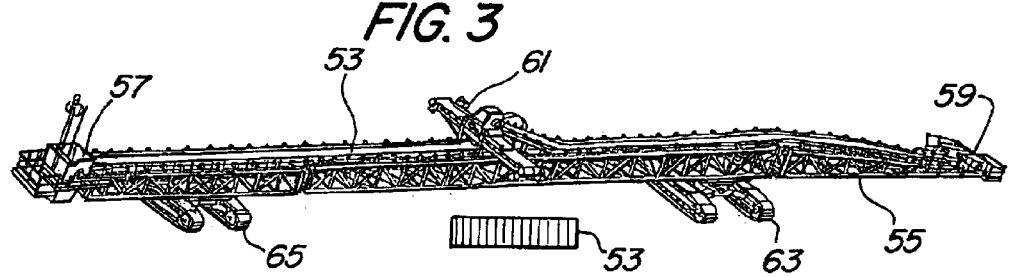
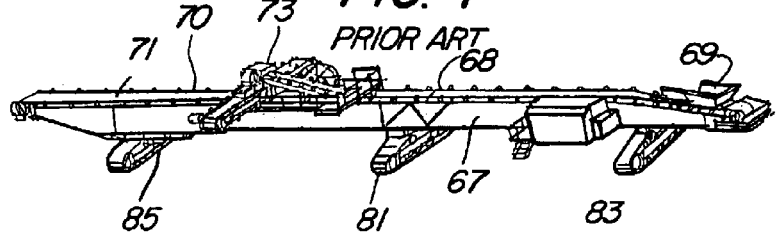
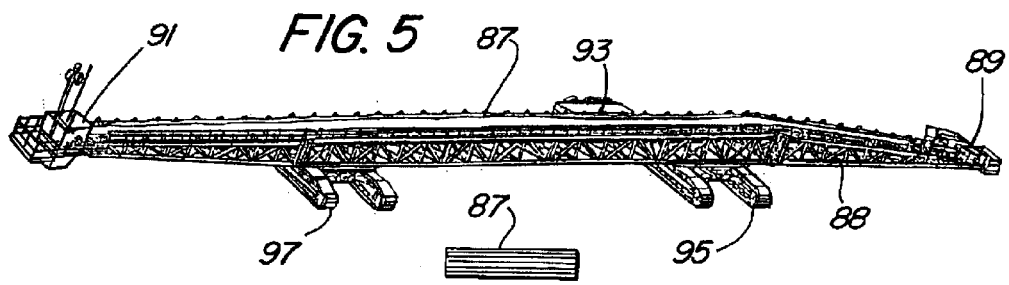

MOBILE CONVEYOR SYSTEM AND METHOD FOR MULTIPLE LIFT STACKING

BACKGROUND OF THE INVENTION

1. Field of the Invention

The present invention relates to the movement of bulk materials, and more particularly, pertains to moving and stacking material, such as ore, coal, granite, clay, salt, and potash, generally referred to herein as "aggregate", by mobile belt conveyor modules.

2. Description of Related Art

The present invention is concerned with depositing aggregate into piles, and more particularly is an improved system and method for depositing aggregate into multi-lift dump sites, such as heap leach stacks, waste dump sites, or material dump sites, for example.

Prior art systems that perform these functions generally employ material conveyors mounted on bridges or trusses called bridge conveyors, bridges, or mobile stacking conveyors. Articulated mobile conveyors having sections are known. Each section is separately movable relative to the ground. Such a system is described in U.S. Pat. No. 5,749,452 granted May 12, 1998 to Brian M. Kenwisher for Mobile Conveyor Including Alignment System. Very long, endless conveyor belt assemblies are also known for transporting loose particulate material over long distances. These conveyors are only moveable in a direction transverse to their length. Such a conveyor assembly is described in U.S. Pat. No. 4,206,840 granted Jun. 10, 1980 to Raymond D. Hanson for a Movable Belt Conveyor Assembly.

One of the problems with the conveyor systems of the prior art is that such systems take time to move any appreciable distance when a new stack is to be started. This is especially true when stacking aggregate which is to be subjected to heap leach processes. These processes are used, for example, to extract copper or gold from the stacked piles of aggregate or leach pads containing the metal or mineral of interest.

In today's world, mining is a basic industry in a global economy. Thus, regardless of the site of the mining or leaching operation, it must be conducted in a manner that minimizes capital costs, minimizes operating costs, and minimizes the delay time between stacking heaps and recovering the metals or minerals of interest.

Prior art multiple lift stacking systems using bridges, with either advance or retreat stacking require considerable down time, a great deal of additional earth work effort, and a considerable amount of labor to extend and retract the overland conveyor used in the process. The prior art stacking processes delay recovery of the metals or minerals of interest from the aggregate. In an ongoing leaching operation, for example, a major concern is to leach the newly stacked aggregate immediately. Thus, at the completion of any lift, a complete leach cycle time is scheduled before stacking the next lift so that the material can be leached to full economic advantage at each lift. These concerns, in general, require movement of the prior art systems that could be both wasteful and unnecessary.

A prior art attempt to solve such problem is described in U.S. Pat. No. 6,085,890 granted Jul. 11, 2000 to Ronald R. Kelly, et al. for Heap Leach Stacking Process. However, even this approach requires down time, a shortcoming which the present invention overcomes.

SUMMARY OF THE INVENTION

Multiple lift pad and dump site stacking is enhanced in flexibility and speed by the use of mobile stackers, mobile trippers, and mobile conveyor modules, which are carried by rolling stock, such as wheels or crawler tracks which are steerable. Some of these modules are also self-powered so they are driveable to the required locations. The combination of mobile conveyor modules bringing aggregate to a tripper for distribution to a bridge stacker and a radial stacker provides efficient multiple lift stacking of a leach pad or a general dump site. Berm building and corridor filling occur at about the same time as the lift stacking. Moreover, the self-powered mobility of the mobile conveyor modules and tripper modules considerably reduces down time when the modules must be relocated.

The invention utilizes a mobile belt conveyor module mounted for movement with respect to the ground on steerable rolling stock. A mobile belt conveyor with a tripper, "mobile tripper module" mounted for movement with respect to the ground on steerable rolling stock is fed aggregate by the mobile belt conveyor module. A mobile stacker is fed aggregate by the mobile tripper module to stack the aggregate to lift level. The stacking method of the present invention comprises advance stacking a lift berm for conveyor travel at about the same time the extension half of the lift is being advance stacked. The retraction half of the lift is also advance stacked, leaving a completely stacked lift without corridors to be filled. Alternatively, the stacking method of the present invention comprises advance and retreat stacking in the extension phase, creating a corridor for conveyor travel. Advance and retreat stacking in the retraction phase while also stacking the corridor, leaves a completely stacked lift without a corridor to fill.

BRIEF DESCRIPTION OF THE DRAWINGS

The exact nature of this invention, as well as its objects and its advantages, will become readily apparent from consideration of the following detailed description in conjunction with the accompanying drawings, in which like reference numerals designate like parts throughout the figures thereof and wherein:

FIG. 2 is a perspective illustration of a mobile radial stacker;

FIG. 3 is a perspective illustration of a self-powered steerable mobile belt conveyor module with a tripper car, "mobile tripper module";

FIG. 4 is a perspective illustration of a bridge stacker or mobile stacking conveyor;

FIG. 5 is a perspective illustration of a self-powered steerable mobile belt conveyor module;

DETAILED DESCRIPTION OF THE PREFERRED EMBODIMENTS

Figure 1:
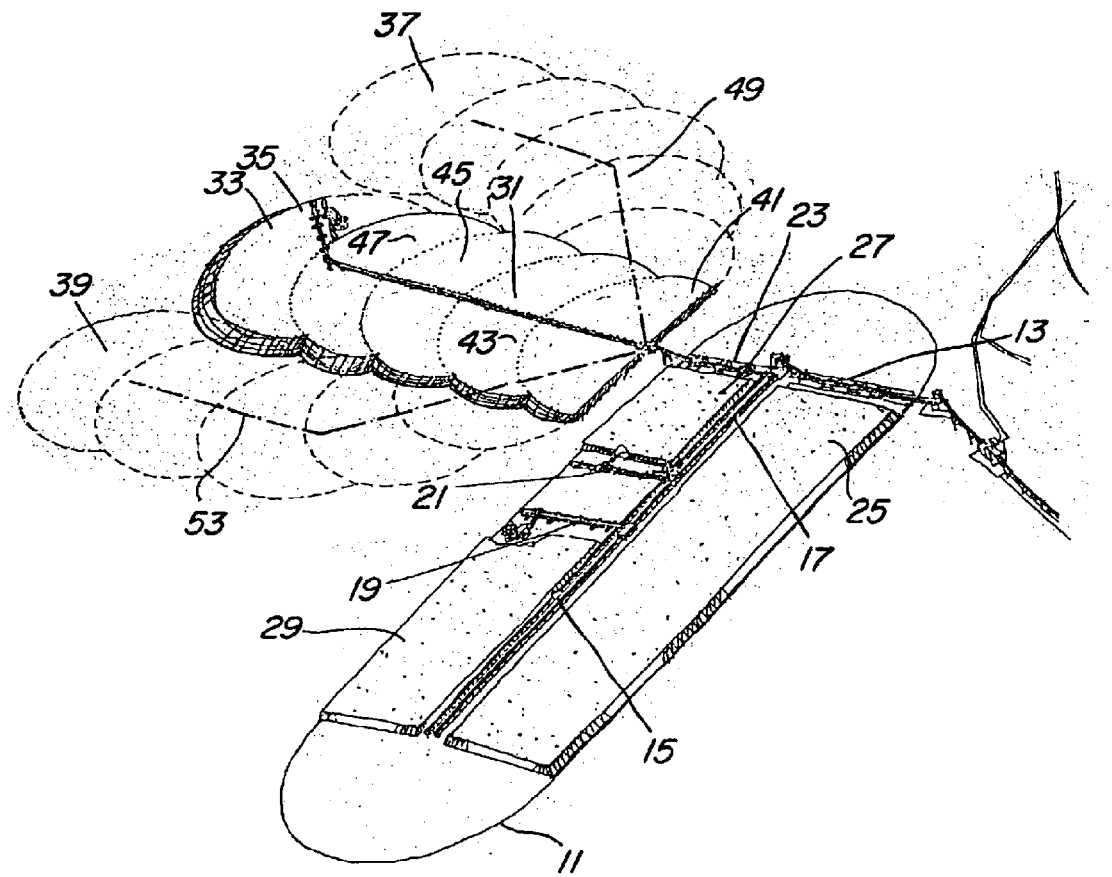
FIG. 1 is a partial perspective schematic layout of an on/off leach pad and waste dump stacking scheme.

FIG. 1 illustrates in three dimensions and schematically one of many possible layouts for an on/off leach pad stacking scheme adjacent to a dump site. The stacking of the leach pad and dump site is being accomplished by prior art equipment. The conveyor modules of the present invention are not being used. Leach pad 11 is typically designed to capture the leach liquid and it's dissolved recoverable minerals or metals. A discharge conveyor 13 delivers aggregate to a stacking overland conveyor 15, which is aligned parallel to the longer axis of the leach pad 11. Overland conveyor 15 supplies the aggregate to bridge stacker 21, which is shown retreat stacking a lift 27.

Ahead of bridge stacker 21, a reclaim bridge conveyor and associated equipment 19, removes the leached aggregate lift 29 from it's path. This reclaimed aggregate is mostly unwanted residue. The removed aggregate is supplied to reclaim overland conveyor 17. Overland conveyor 17 transfers the aggregate to conveyor 23, which, in turn, supplies it to an extendible overland conveyor 31. The extendible overland conveyor 31 is shown fully extended to the area 33 furthest away from the material supply. The extendible overland conveyor 31 supplies it's aggregate to a stacking bridge 35, which is shown radially stacking the dump aggregate.

A normal dump stacking process would start with segment 41. Then segment 43 would be stacked. Then segment 45, and segment 47 would be stacked sequentially. After this five segment area is radially stacked, the extendible overland conveyor 31 would be moved to another area, indicated by phantom lines 37 following a path generally indicated by phantom lines 49, for example. The stacking of each area may take up to a year. A third waste dump stack, area 39, is also illustrated in phantom lines. A possible path of the extendible overland conveyor 31 for this area is illustrated by phantom lines 53.

FIG. 2 illustrates a typical radial stacker, well known in the prior art, which is used in the system and method of the present invention. Radial stacker 41 has an aggregate receiving end 43 and an aggregate discharge end 45 with a belt conveyor in between. The radial stacker 41 is preferably mounted on a pair of crawler tracks 49, 51. Crawler tracks 49 are located about three quarters along it's length to the discharge end 45, below a lift structure 47 that elevates the discharge end 45 of the radial stacker 41 above it's receiving end 43. The crawler tracks 49, 51 are moveable so that movement of crawler tracks 49 causes the radial stacker to follow a fixed radial arc. Movement of crawler tracks 49 and 51 parallel to the lengthwise axis of radial stacker 41 changes the travel arc for the radial stacker. The rectangular symbol 41 below the three dimensional drawing of the radial stacker shall be used in drawings hereinafter to indicate the radial stacker.

FIG. 3 illustrates a self-powered conveyor belt tripper/stacker module 53, according to the present invention. The tripper module has a receiving hopper 59 at one end, and a discharge chute 57 at it's other end. A reversible tripper car 61 is movable along the truss structure 55 to remove aggregate from the main belt and discharge the aggregate on either side of the tripper module 53. The truss structure 55 is mounted on rolling stock, such as wheels or a pair of crawler tracks 65, for example, at or toward one end and another pair 63 at or toward the other end. The crawler tracks are steerable through about one hundred and eighty degrees. With driveability in a forward and reverse direction the crawler trucks are driveable through three hundred and sixty degrees. The steerable crawler tracks are driven by a power source (not shown). The tripper module 53 is preferably about 300 feet long from its receiving hopper 59 to its discharge chute 57. The rectangular symbol 53 below the three dimensional drawing is a symbol for the tripper module 53 and will be used to represent the tripper module 53 in subsequent drawings.

FIG. 4 illustrates a mobile bridge stacker or mobile stacking conveyor 67, well known in the prior art, which has a hopper 69 at one end for receiving aggregate and belt conveyor 71 which transports the aggregate to a tripper 73. The tripper stacks the aggregate in front of the bridge stacker 67. The entire bridge is made up of multiple sections 68, 70 pinned together, which allows for contraction and expansion of the length of the bridge. Each section is supported by crawler tracks 83, 81, and 85. These crawler tracks allow for radial and lateral movement of bridge stacker 67.

FIG. 5 illustrates a self-powered steerable mobile belt conveyor module 87 according to the present invention. The belt conveyor module 87 has a receiving hopper 89 at one end and a discharge chute 91 at the other end with a conveyor belt in between. The mobile belt conveyor module 87 is built on a truss structure 88, which is light weight and maneuverable. The truss structure supports a power unit 93 that powers rolling stock, like wheels or a pair of crawler tracks 95 and 97, for example, with crawler tracks 95 disposed at or toward one end and another pair 97 disposed at or toward the other end. The crawler tracks are steerable through about one hundred eighty degrees and driveable through three hundred and sixty degrees. The mobile belt conveyor module 87 is preferably 250 feet long from its receiving hopper 89 to its discharge chute 91. The rectangular symbol 87 below the illustration of the mobile belt conveyor module 87 is a symbol for the mobile belt conveyor and will be used to represent the belt conveyor module 87 in subsequent drawings.

Figure 6:
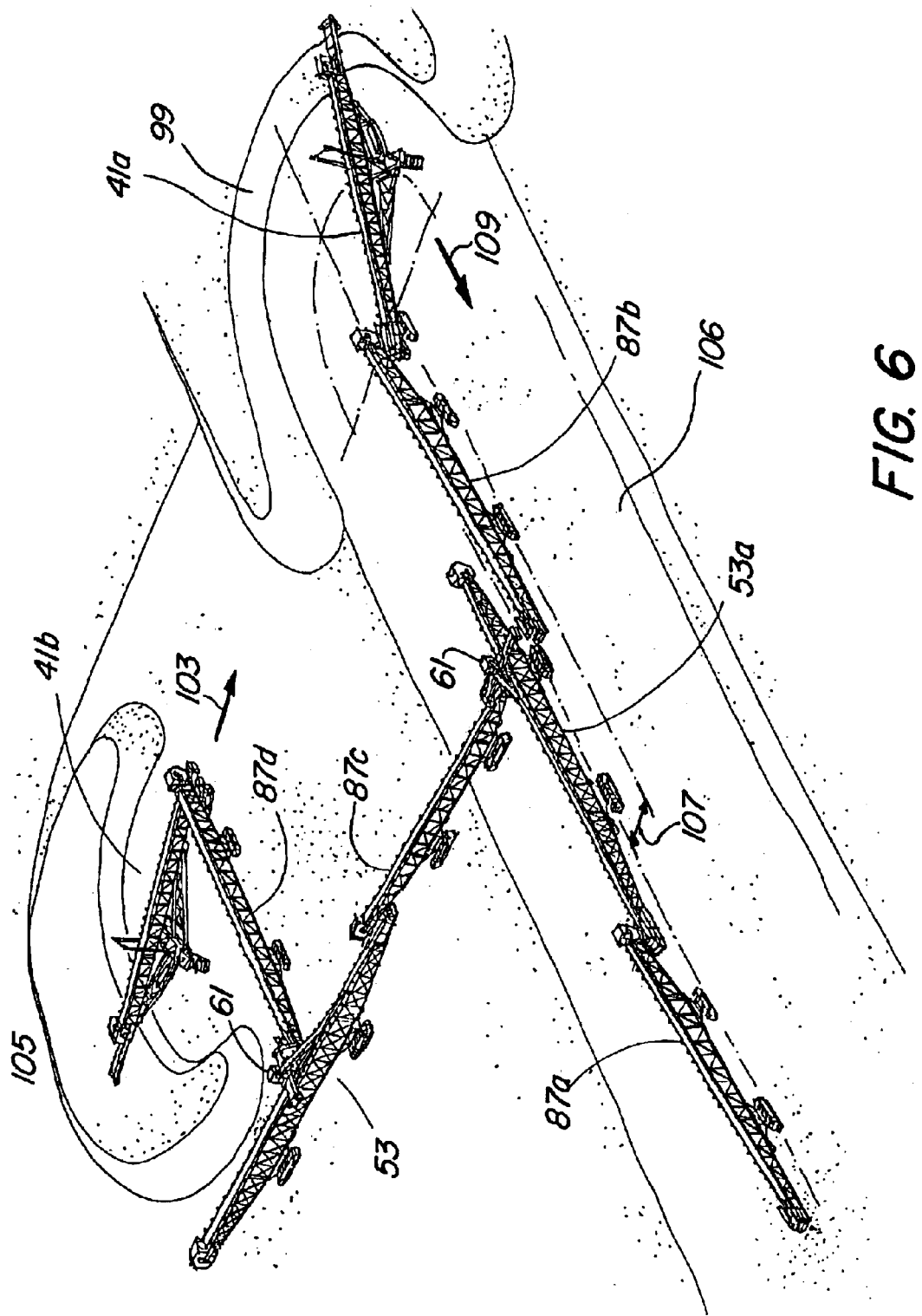
FIG. 6 is a perspective illustration of a stacking scheme utilizing the radial stacker, the self-powered mobile tripper module, and the self-powered mobile belt conveyor.

FIG. 6 represents a retreat stacking system utilizing the system components of the present invention. This figure illustrates the flexibility of the conveyor modules of the present invention. In place of an overland conveyor, for example, a series of mobile conveyor modules 87 are positioned along a center line of a stack pad. The entire assembly is stacking and retreating in the direction of arrows 109 and 103.

As the series of mobile conveyor modules 87 retreat along the corridor 106 in direction 109, aggregate is being fed to tripper module 53a, which supplies the aggregate through it's tripper unit 61, to another mobile conveyor module 87b. The tripper unit 61 is a reversible discharge conveyor capable of aggregate discharge to both sides. Tripper module 53a is shown loading aggregate into mobile belt conveyor module 87b which is displaced laterally 107 from tripper 53a by approximately ten to twelve feet. Mobile belt conveyor module 87b unloads the aggregate into the receiving hopper of a radial stacker 41a which retreat stacks the aggregate 99 in corridor 106, thereby filling the corridor.

At the same time that corridor 106 is being stacked, tripper module 53a is supplying aggregate by way of it's reversible shuttle discharge tripper 61 to another mobile conveyor unit 87c which provides it's aggregate to another tripper conveyor 53b which supplies it's aggregate by way of it's shuttle discharge conveyor 61 to another mobile belt conveyor module 87d, which in turn, feeds another radial stacker 41b. Radial stacker 41b stacks aggregate 105 radially in a retreat direction 103 that is lateral to corridor 106.

Figure 7:
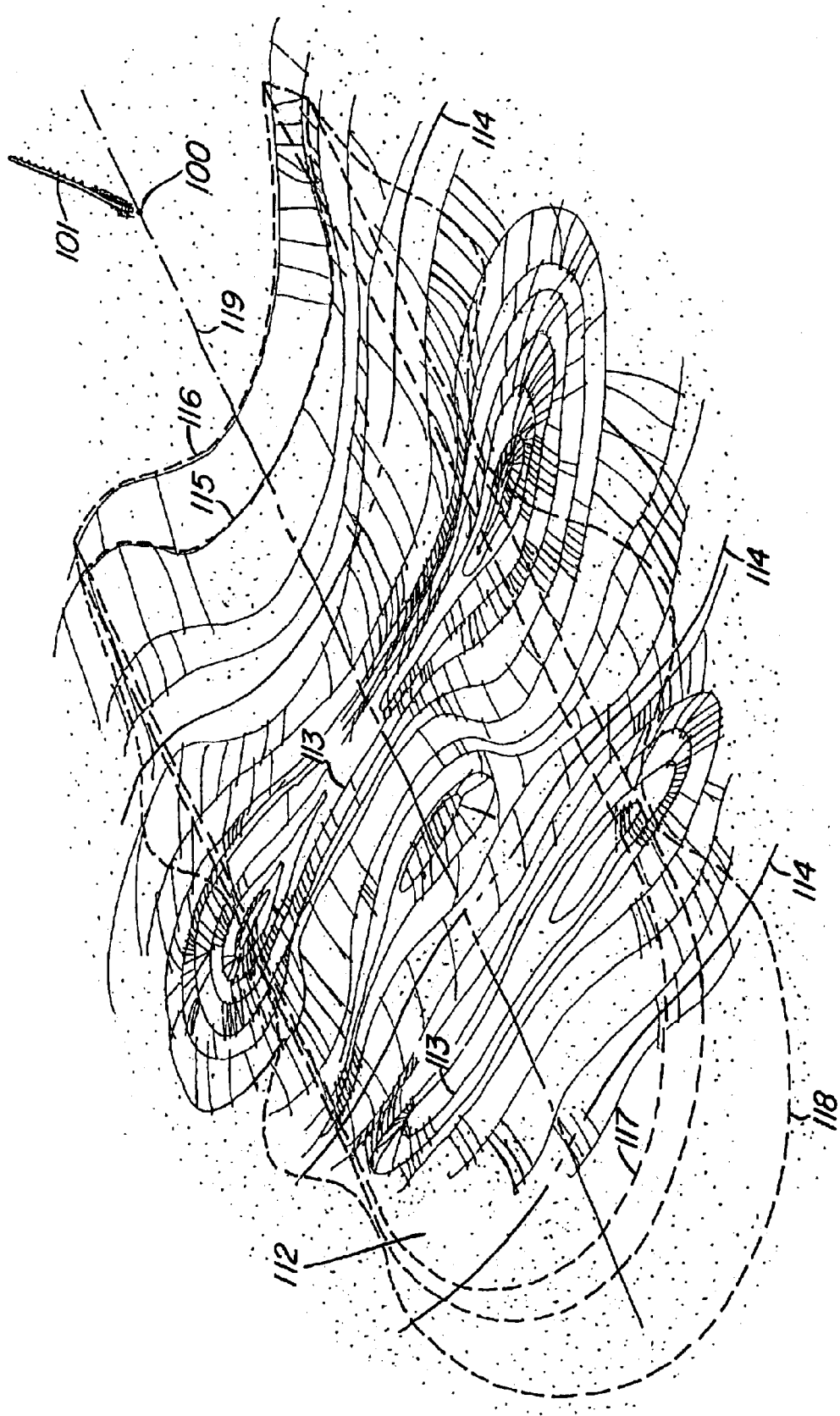
FIG. 7 is an isometric illustration indicating an area topography before heap stacking has begun.

FIG. 7 shows an isometric view of the topography of an area 112 along with a fixed conveyor belt 101 which is intended to supply all the bulk prepared materials which are to be stacked on the heap stacking area 112. Fixed conveyor belt 101 will discharge it's aggregate at discharge point 100.

The topography of the leach stacking area 112 includes two relatively small ridges, 113 and three relatively small valleys 114 which may be naturally occurring or have been prepared by earth moving equipment. For illustration purposes, area 112 will be shown as stacked using two lift cycles. The first lift will be at an elevation that intersects the near side topography along first lift intersection contour 115. The second lift will be at an elevation that intersects the near side topography along second lift intersection contour 116. The final crest of the entire heap is to be the final heap crest contour 117. The final toe is to be the final heap toe contour 118.

The center line axis 119 of the heap area 112 will be the center line axis for the corridors of the two lift cycles according to the preferred embodiment of the present invention. It should be understood, however, that the present invention includes any reasonable number of lifts or lift cycles with the center line axis changing from lift to lift as desired. Center line axis 119 intersects the discharge point 100 of the fixed conveyor belt 101 so that conveyor belt 101 transfers it's material into the system at discharge point 100 during the entire heap stacking process for area 112.

An area, like area 112 with it's unique geometry, is suitable for a leach pad since it allows the aggregate to be stacked so that the top of the first lift clears the ridges 113, thereby allowing the valleys 114 to be used to collect the lixiviant, or leaching liquids containing the recovered metals or minerals, after it has passed through the heap. This choice of a natural topography alleviates the requirement for prior earth work preparation. This site is also suitable for dump stacking aggregate.

Figure 8:
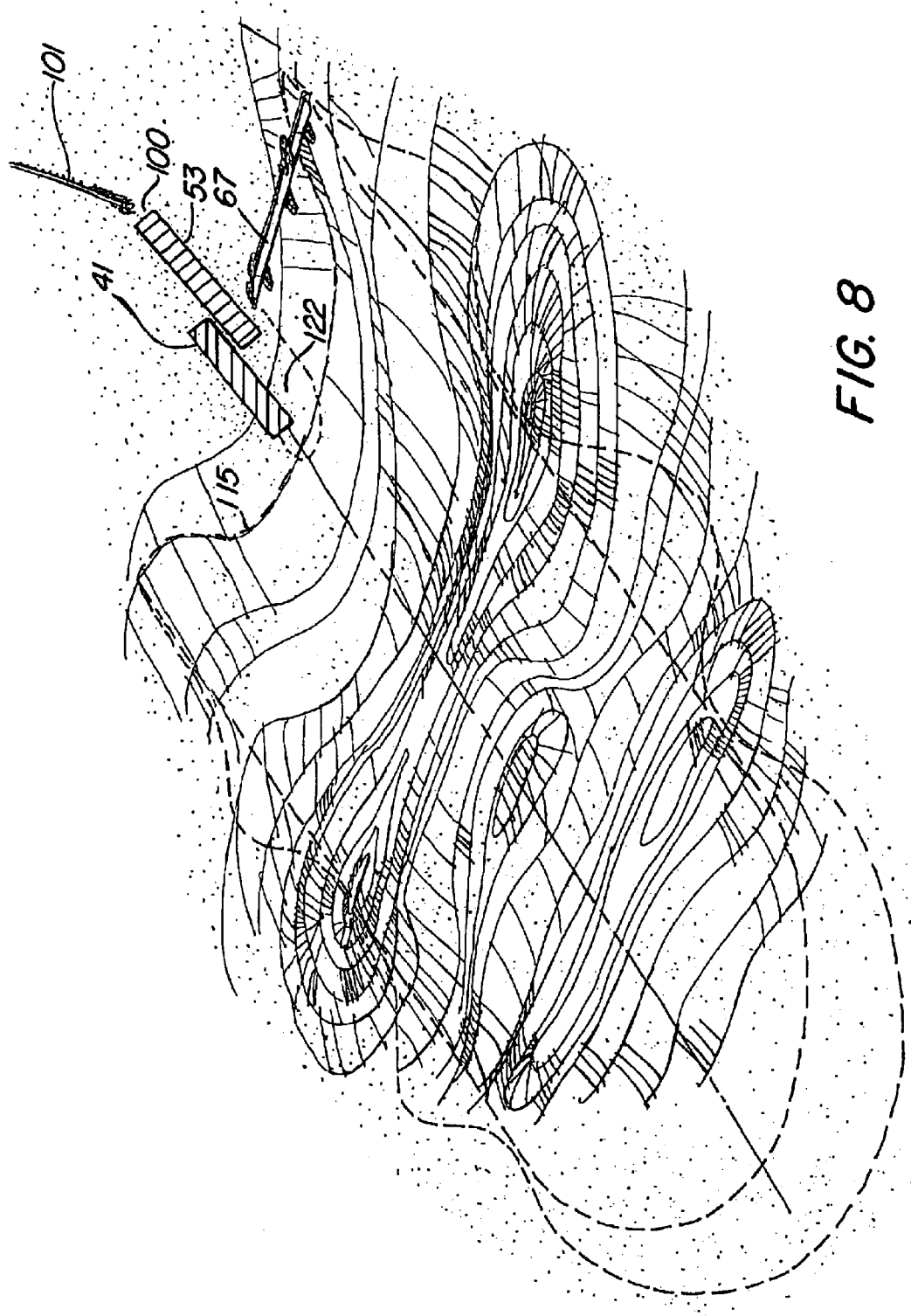
FIG. 8 is an isometric illustration indicating the disposition of stacking system components on an area topography at the beginning of a stacking cycle for the first lift.

FIG. 8 illustrates the topography of FIG. 7 with the stacking system components according to the present invention located to begin the stacking process. The view of the area topography is from the far side looking back towards the near side of material supply at discharge point 100 before the first lift cycle begins. The system components are a tripper module 53, a stacker 41, and a bridge stacker 67. All the components are located to begin stacking the extension phase of a lift cycle in an advance stacking mode. The aggregate will begin to be stacked in front of bridge 67 in a tapered fashion outward so that the bridge 67 can travel on top of the newly deposited lift material. In addition, stacker 41 will be building a berm in corridor area 122 during this extension phase of the lift stacking cycle. Stacker 41 may be a radial stacker or a regular conveyor stacker, which can not radial stack, but is capable of stacking a berm (berm stacker).

Figure 9:
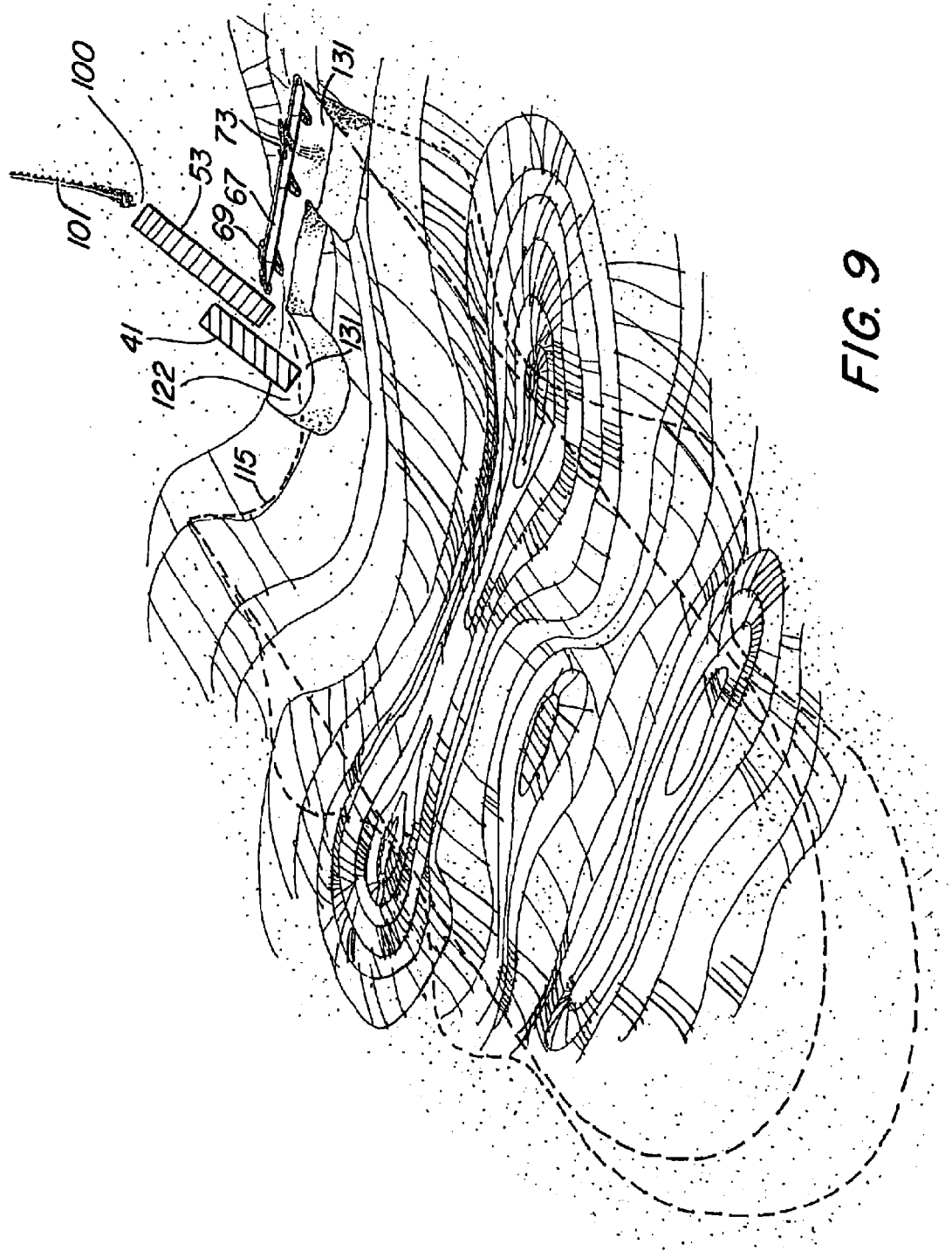
FIG. 9 is an isometric illustration indicating the disposition of stacking system components on an area topography after the extension phase of first lift stacking has begun.

FIG. 9 illustrates the location of the stacking system components with respect to the area topography after stacking has begun. Radial stacker 41 is stacking aggregate in corridor area 122 building a berm to first lift elevation 131, while at the same time advancing to remain abreast of bridge stacker 67. Bridge stacker 67 is being supplied with material from tripper module 53, which is also supplying stacker 41. Bridge stacker 67 stacks the aggregate in front to it's lift elevation 131. Bridge stacker 67 and stacker 41 extend out on top of the newly stacked aggregate at lift level 131.

Figure 10:
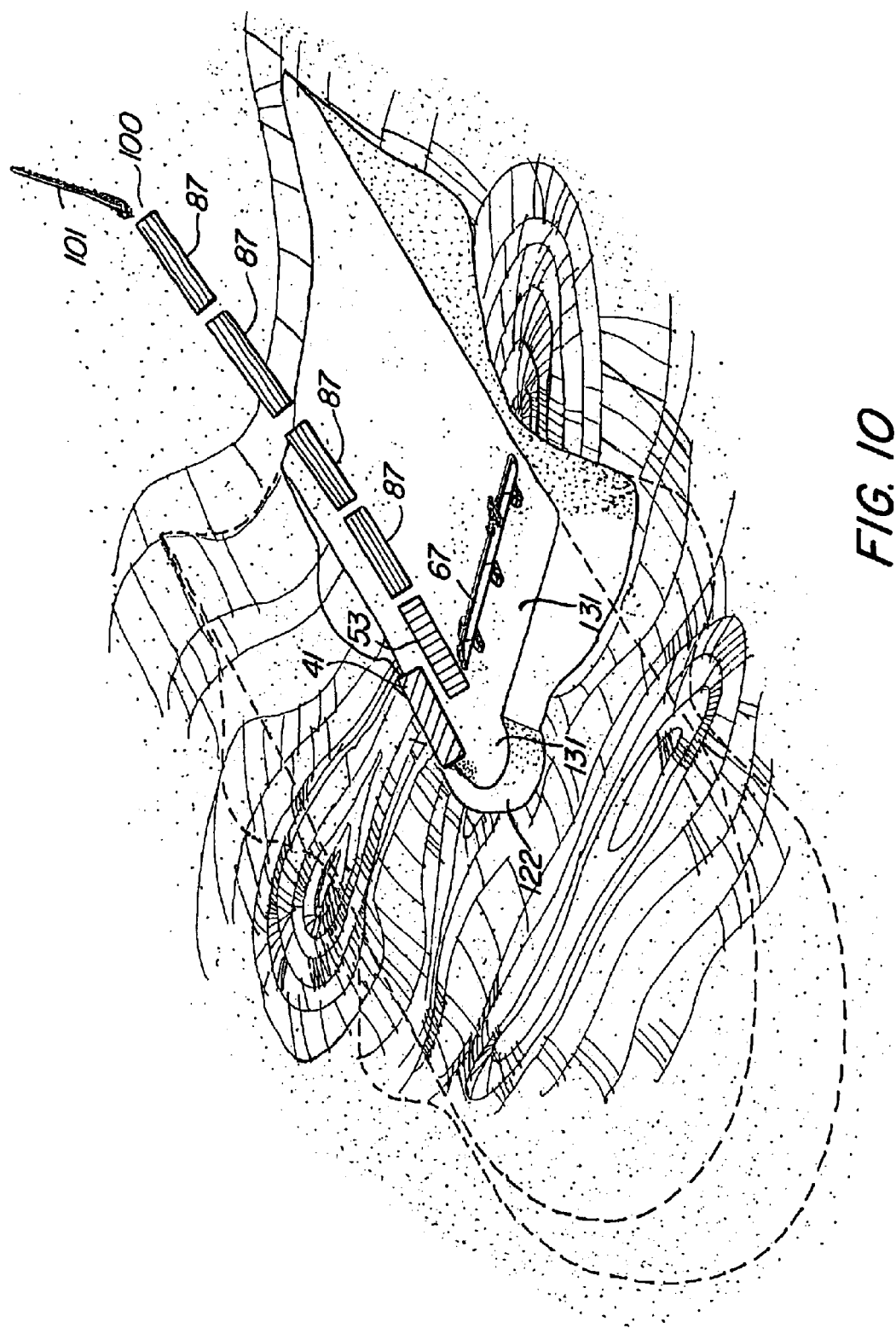
FIG. 10 is an isometric illustration indicating the disposition of the stacking system components on an area topography wherein a stacker is building a berm to lift grade elevation.

FIG. 10 illustrates the position of the stacking system components after the advance stacking mode has progressed, as can be seen by the number of mobile belt conveyor modules 87 needed to carry the aggregate from transfer point 100 to tripper module 53. Tripper module 53 continues to supply the aggregate to bridge stacker 67 and stacker 41. Stacker 41 continues to deposit material to build the berm 122 to grade level 131. Bridge stacker 67 continues to deposit aggregate material in front of bridge 67 to stack aggregate in it's path to lift elevation 131. Bridge stacker 67 could be operating in both the advance stacking and retreat stacking mode, if desired. This process is described and illustrated hereinafter.

The mobile belt conveyor belt modules 87 are moved into position as needed during the extension phase of a lift stock cycle to keep up with the pace of tripper 53, bridge stacker 67, and berm stacker 41. Because the mobile belt conveyors are very mobile and maneuverable, it becomes more or less like adding links to a chain.

Figure 11:
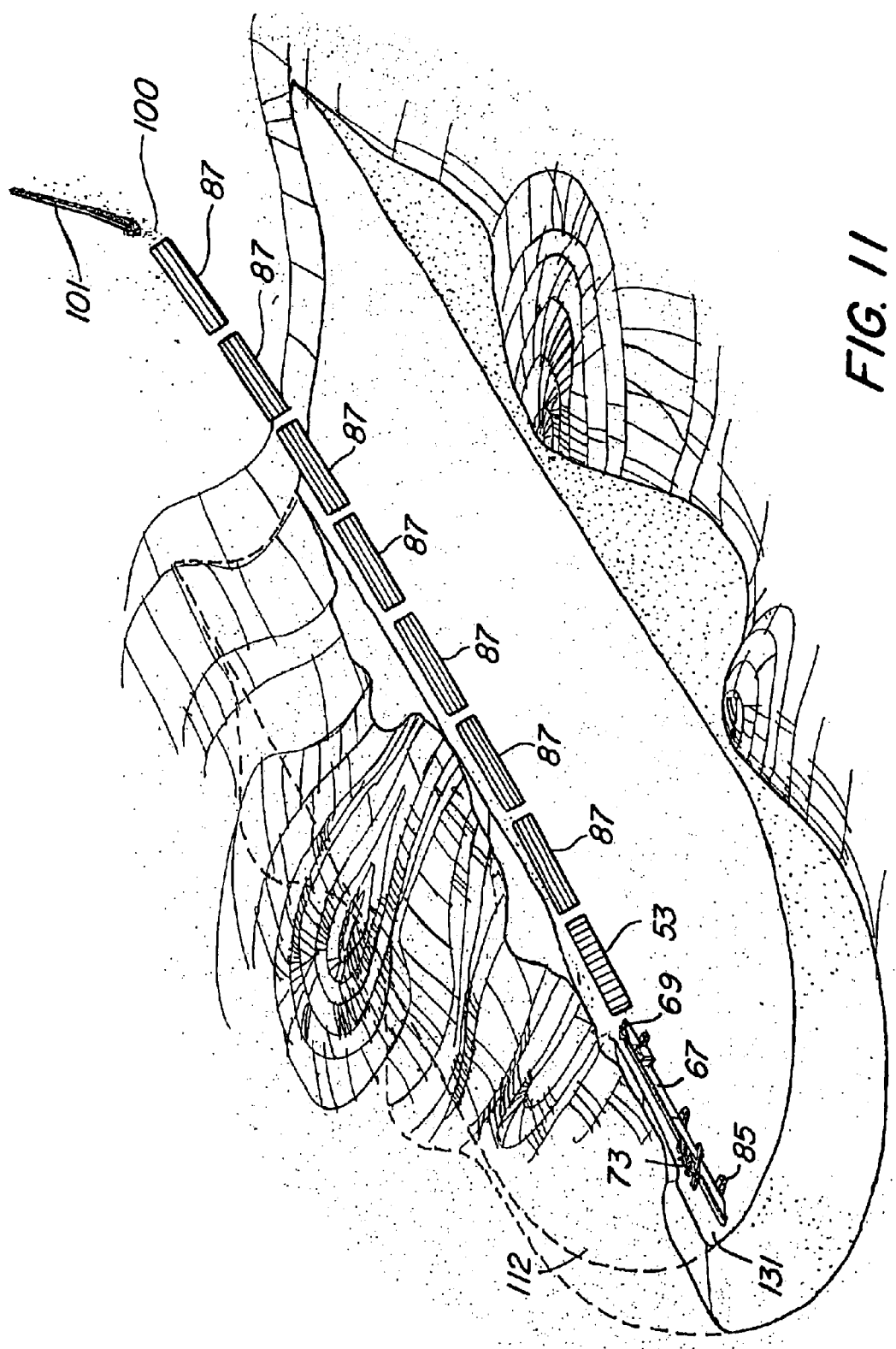
FIG. 11 is an isometric illustration indicating the disposition of stacking system components on an area topography when the first lift cycle has reached the end of the area furthest away from the material supply.

FIG. 11 illustrates the disposition of stacking system components on the area topography when the first lift cycle extension phase has reached the end of the area furthest away from the material supply point 100. At this time, the bridge stacker 67 is rotating and translating around the end of area 112 to radially stack the end area and prepare to begin the retraction phase of the first lift cycle. The tripper 53 has been extended full length by using as many of the 250 feet long mobile belt conveyor modules 87 as required to supply aggregate from the discharge point 100 to tripper 53. Tripper 53, in turn, supplies the aggregate to stacking bridge 67, which is now rotating and translating around the area 112 by moving on its track units 85 while continuing to deposit aggregate in front of it. In this way, the far end semi-circle portion of lift 131 is stacked before retraction begins.

Figure 12:
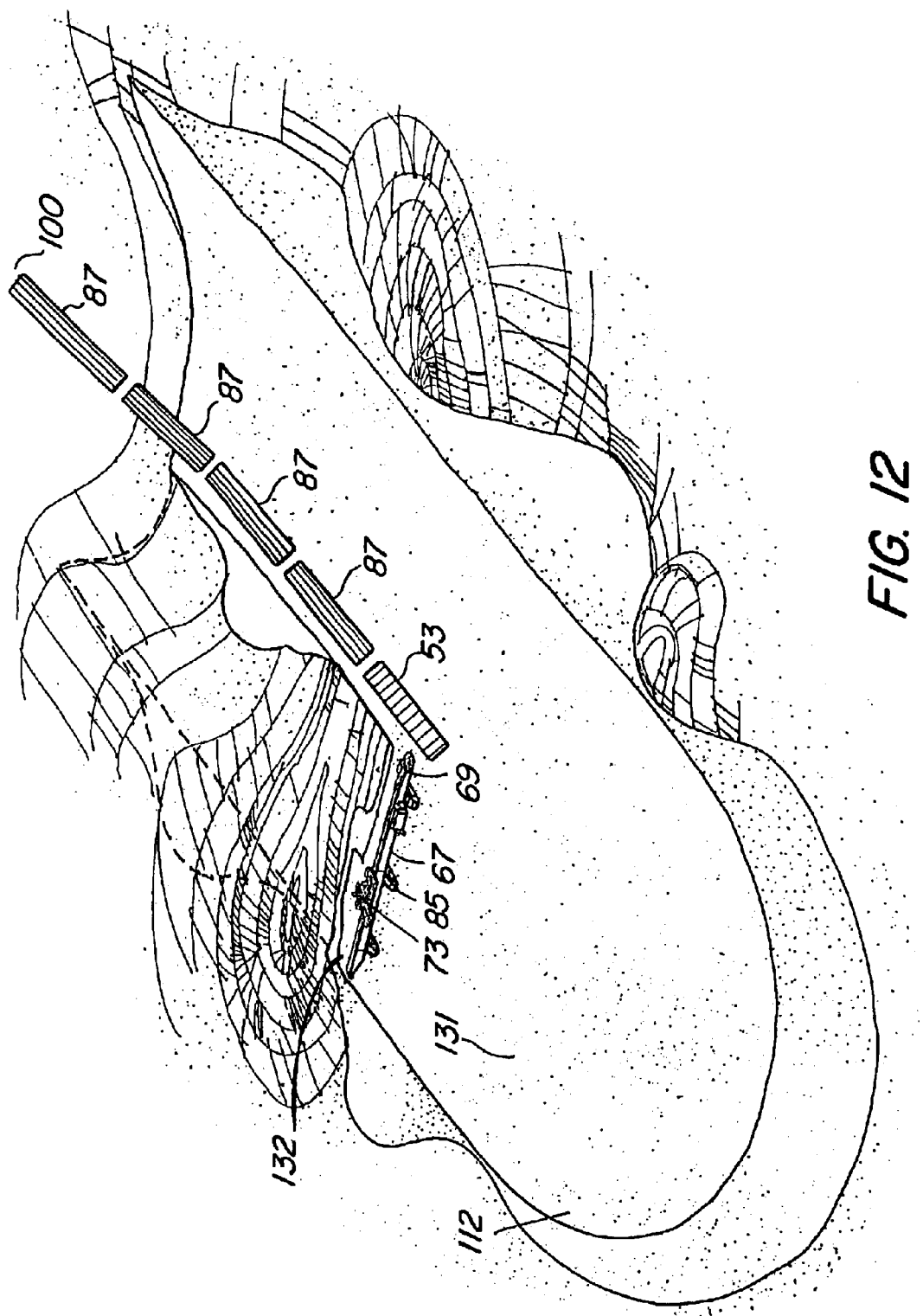
FIG. 12 is an isometric illustration indicating the disposition of stacking system components on an area topography during the retraction phase of first lift stacking.

FIG. 12 indicates the disposition of the stacking system components of the present invention on the area topography during first lift retraction. The number of mobile belt conveyor modules 87 has been reduced, because the distance between the aggregate discharge point 100 and the tripper 53 is being reduced during retraction. Tripper 53 feeds bridge stacker 67, which continues to deposit aggregate to lift level 131. Bridge stacker 67 continues to travel on top of the newly stacked lift level 132. Tripper 53 is retracting on the berm that was stacked during the extension phase. No berm stacker is required during this retraction phase.

Figure 13:
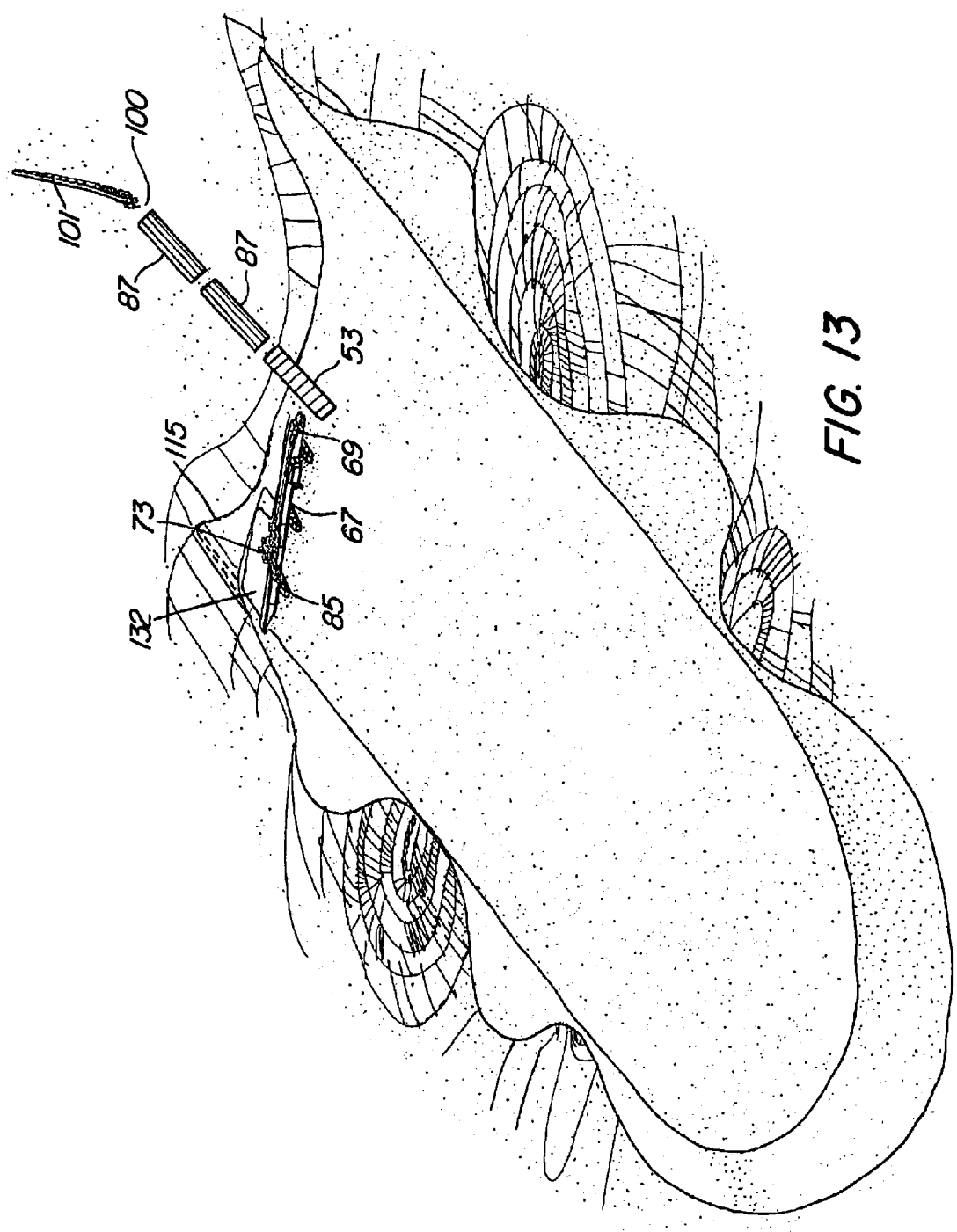
FIG. 13 is an isometric illustration indicating the disposition of the stacking system components on an area topography when the first lift cycle is being completed.

FIG. 13 illustrates the disposition of the stacking system components of the present invention on the area topography when the first lift retraction cycle is almost completed. The conveyor modules 87 have been reduced considerably because the distance between discharge point 100 and tripper 53 has been reduced to a minimum. Bridge stacker 67 continues to deposit materials in front as it translates over the newly deposited aggregate towards the lift contour 115.

Figure 14:
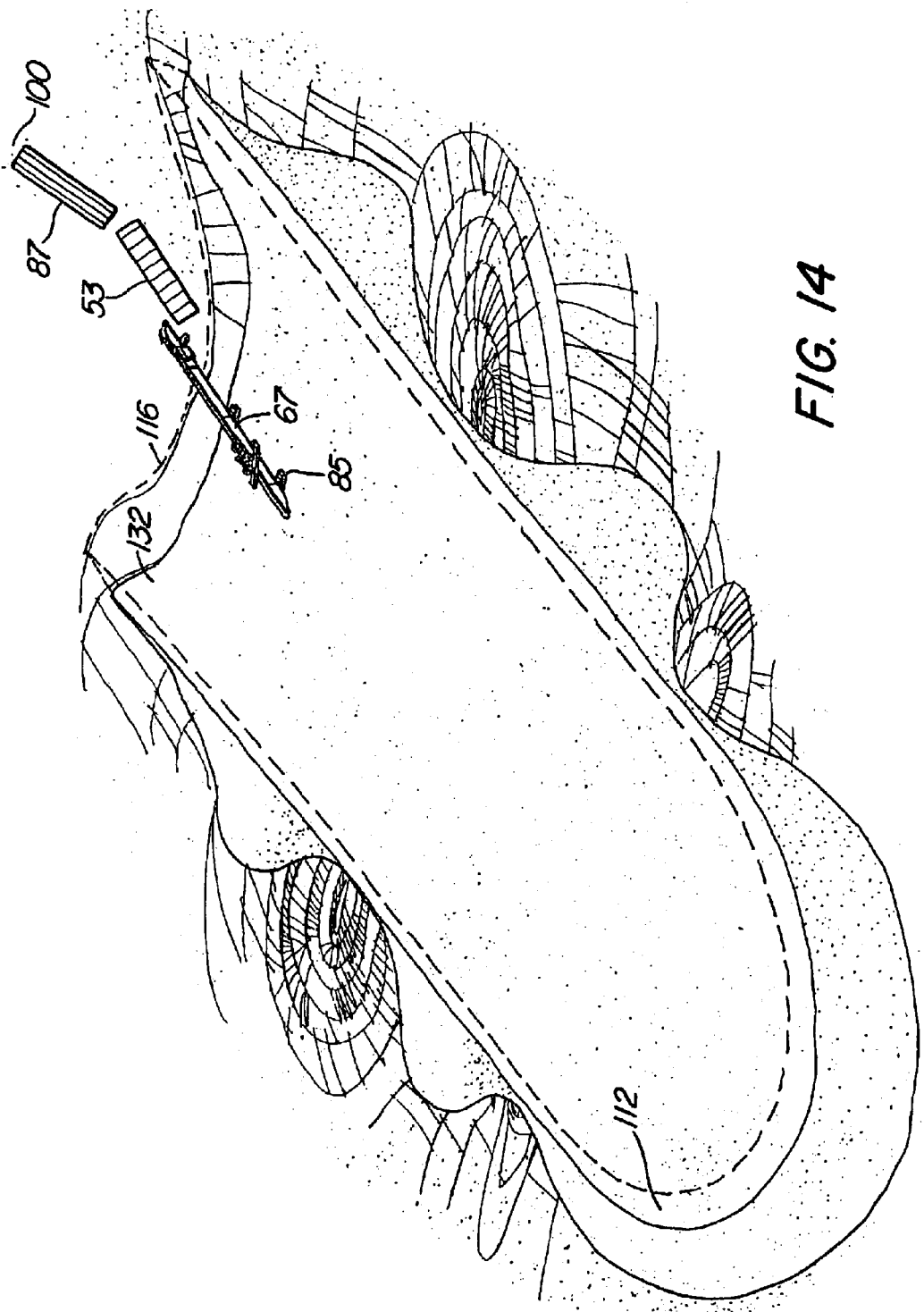
FIG. 14 is an isometric illustration indicating the disposition of stacking system components on an area topography after the first lift cycle has completed and the stacking bridge is being rotated into a starting position for the second lift cycle.

FIG. 14 illustrates the disposition of the stacking system components of the present invention on the area topography when the first lift cycle has been completed. As can be seen, the bridge stacker 67 is rotating and translating on it's tracks 85 to the starting position behind contour 116 for the start of the second lift cycle. The distance between the bridge stacker 67 and the discharge point 100 is quite small, only requiring one conveyor module 87 and tripper module 53.

Figure 15:
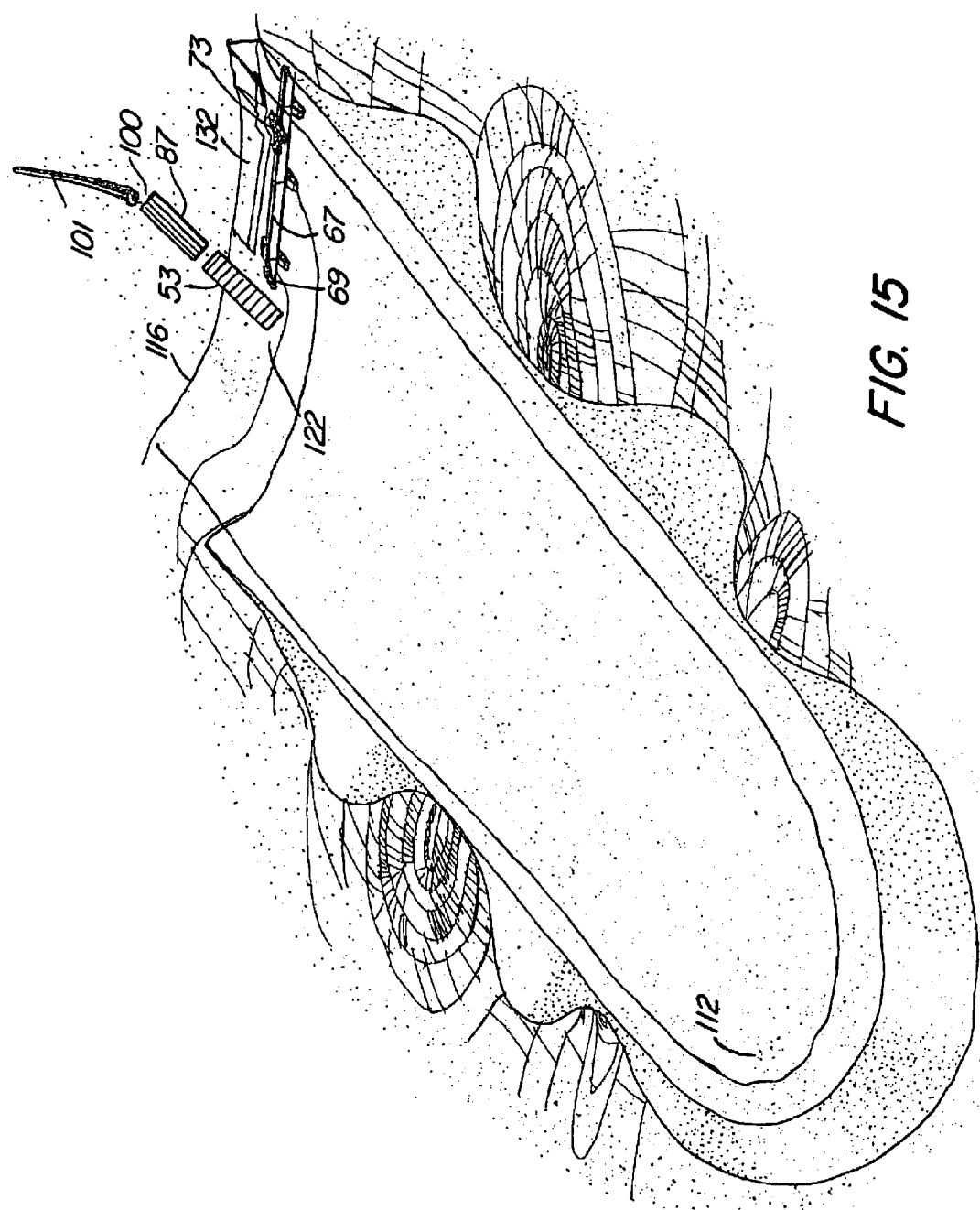
FIG. 15 is an isometric illustration indicating the disposition of stacking system components on an area topography after the extension phase of the second lift cycle has begun.

FIG. 15 illustrates the disposition of the stacking system components on the area topography when the second lift cycle has begun by tapering the current lift 132 into area 122 from the second lift intersection contour 116. An alternative approach would be to build a berm for the bridge stacker 67 to ride up on and then proceed to advance and retreat stack the second lift in a manner more specifically illustrated and described hereinafter. Aggregate is discharged at point 100 from fixed conveyor 101 onto mobile belt conveyor module 87 and then to tripper module 53. Tripper module 53 supplies bridge stacker 67 which stacks the aggregate behind the bridge stacker 67 as it advances in this extension phase, in a typical retreat stacking method.

Bridge 67 travels on top of the previously stacked lift 131, which is at the same grade elevation that newly stacked lift 132 is being deposited on. As bridge 67 continues outward in this extension phase of retreat stacking, a corridor 122 is being formed.

Figure 16:
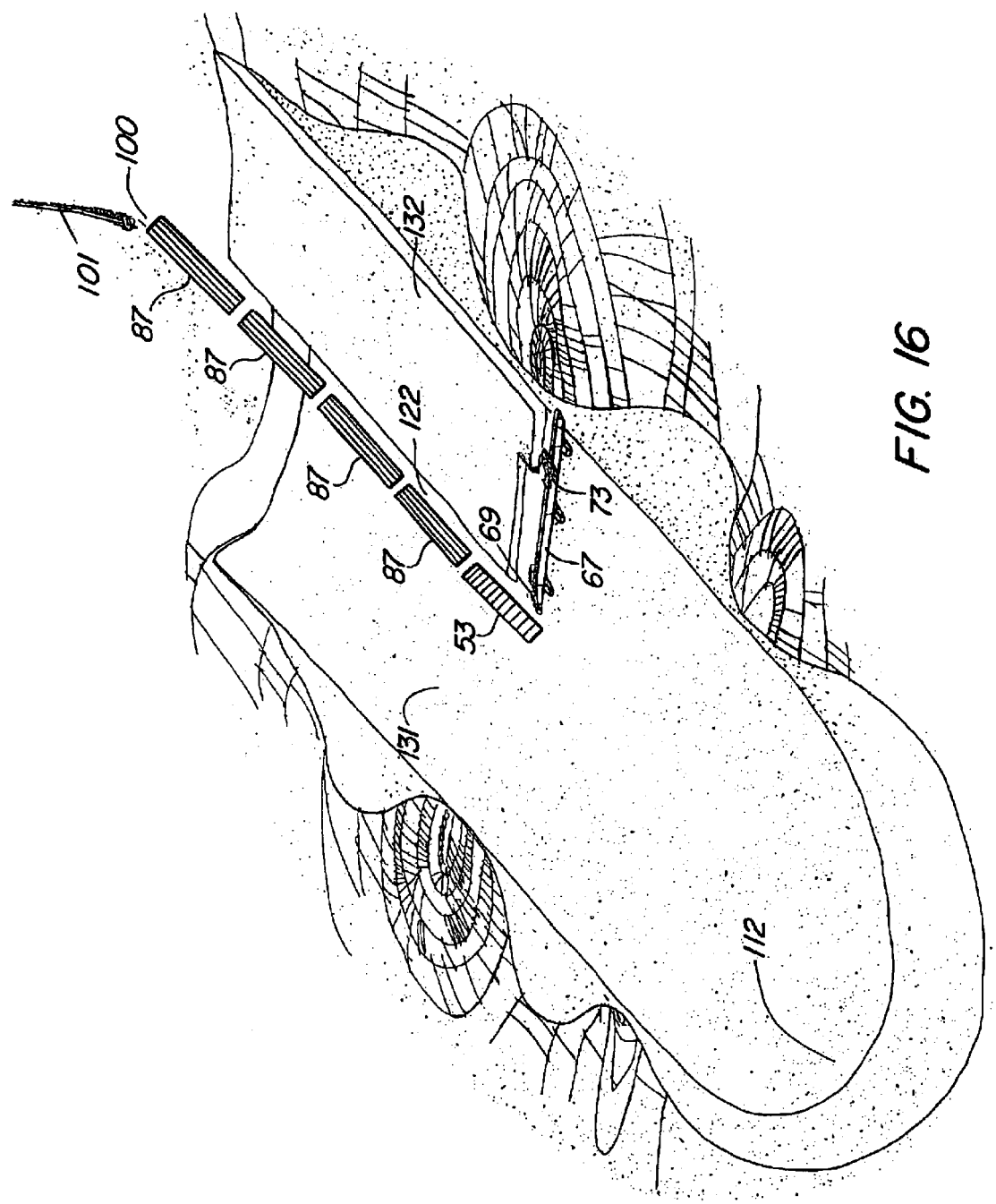
FIG. 16 is an isometric illustration indicating the disposition of stacking system components on an area topography during the extension phase of the second lift cycle.

FIG. 16 illustrates the disposition of the stacking system components of the present invention on the area topography when the extension phase of the second lift is half way completed. Bridge stacker 67 is stacking material behind it, as it moves forward towards the end of the stack area. Additional mobile belt conveyor modules 87 have been added as needed. The mobile belt conveyors 87 feed tripper module 53 which feeds bridge stacker 67. The mobile belt conveyors 87 and tripper module 53 are traveling on the previously stacked heap, which is at a level lower than the second lift 132 thereby creating a corridor 122.

Figure 17:
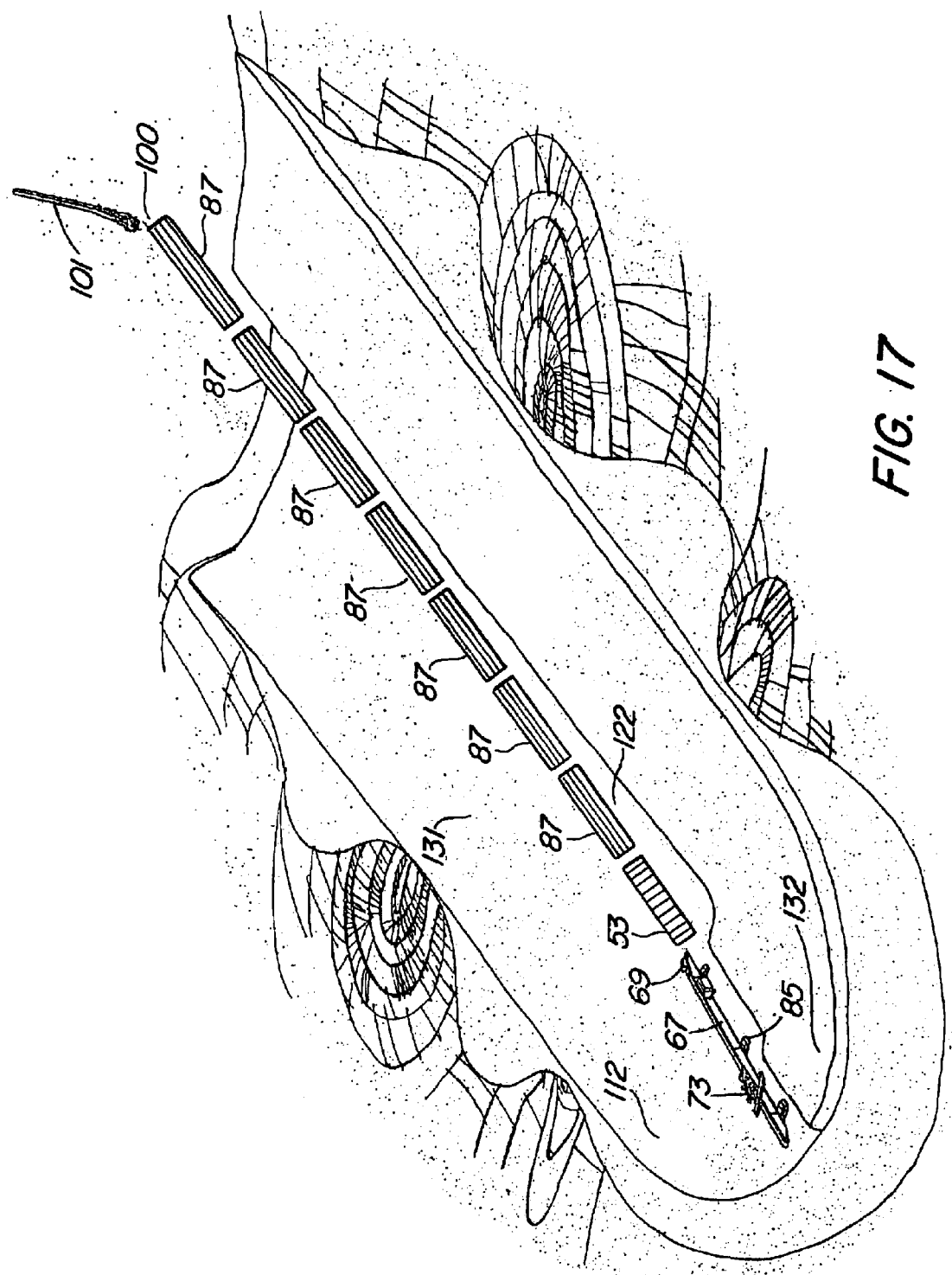
FIG. 17 is an isometric illustration indicating the disposition of stacking system components on an area topography when the second lift cycle has reached the end of the area furthest away from the material supply and the stacking bridge is being rotated and translated around the end of the area to prepare to begin retraction.

FIG. 17 shows the disposition of the stacking system components of the present invention on the area topography when the second lift extension cycle has reached the end of area 112, which is furthest away from the material supply point 100. At this point, the maximum number of mobile belt conveyor modules 87 are being utilized. Stacker bridge 67 is, at this time, rotating and translating on it's tracks 85 in order to complete the far end semicircle portion of lift 132. Tripper module 53 receives aggregate from the last in the line of mobile belt conveyor modules 87 to feed bridge stacker 67 as it continues to stack material in the retreat mode.

Figure 18:
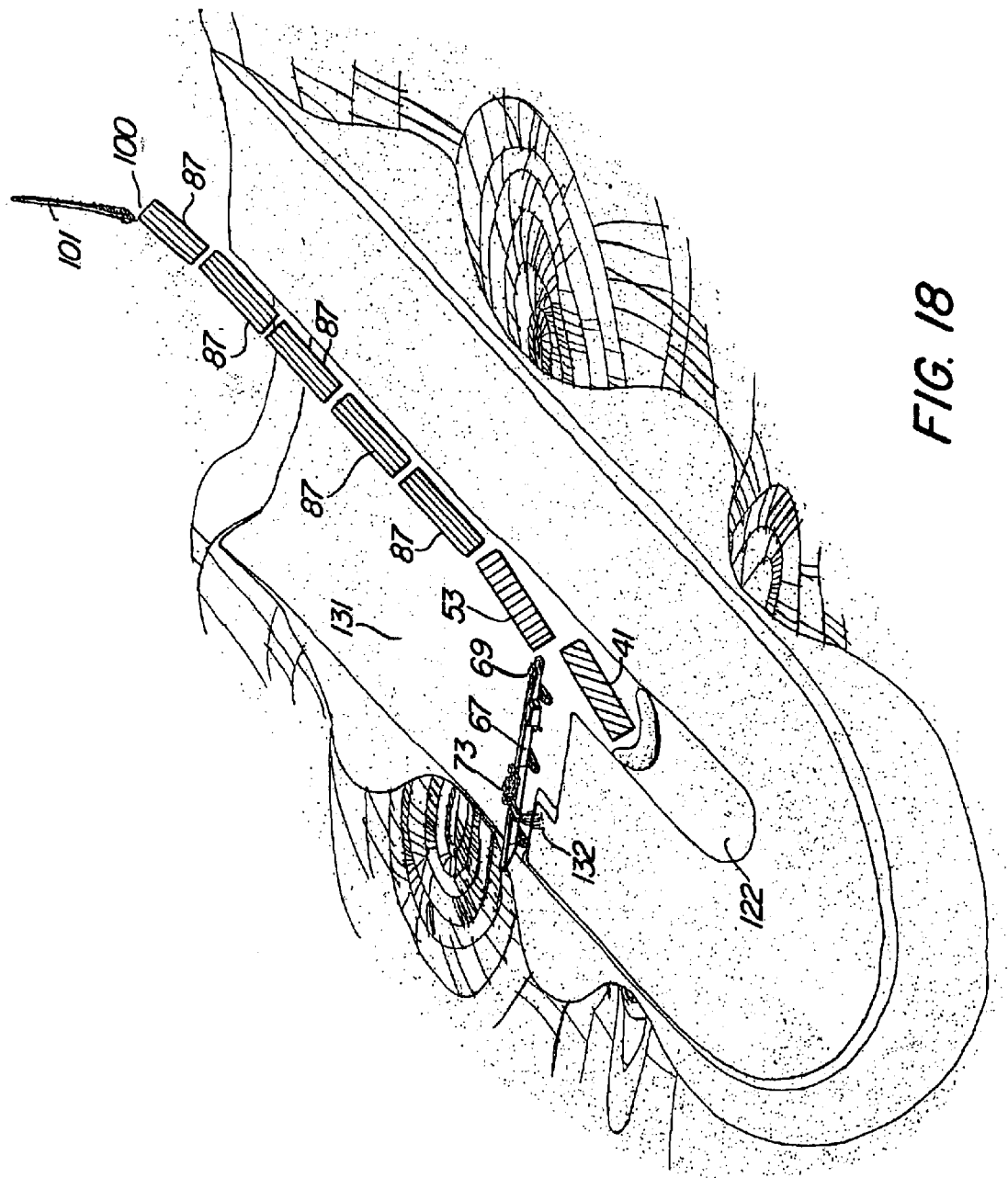
FIG. 18 is an isometric illustration indicating the disposition of stacking system components on an area topography during the retraction phase of a second lift cycle.

FIG. 18 illustrates the stacking system modules of the present invention in the area topography when the second lift is in retraction. The bridge stacker 67 is stacking material on the heap 131 to the second lift level 132. In retraction, the mobile belt conveyor modules 87 are being removed, as they are no longer needed. The aggregate material is supplied to the tripper module 53. During retraction, according to the present invention, the tripper module 53 supplies the aggregate to a bridge stacker 67 and to a radial stacker 41. Bridge stacker 67 continues to retreat and stack the aggregate while the radial stacker 41 starts to stack aggregate into corridor 122.

Figure 19:
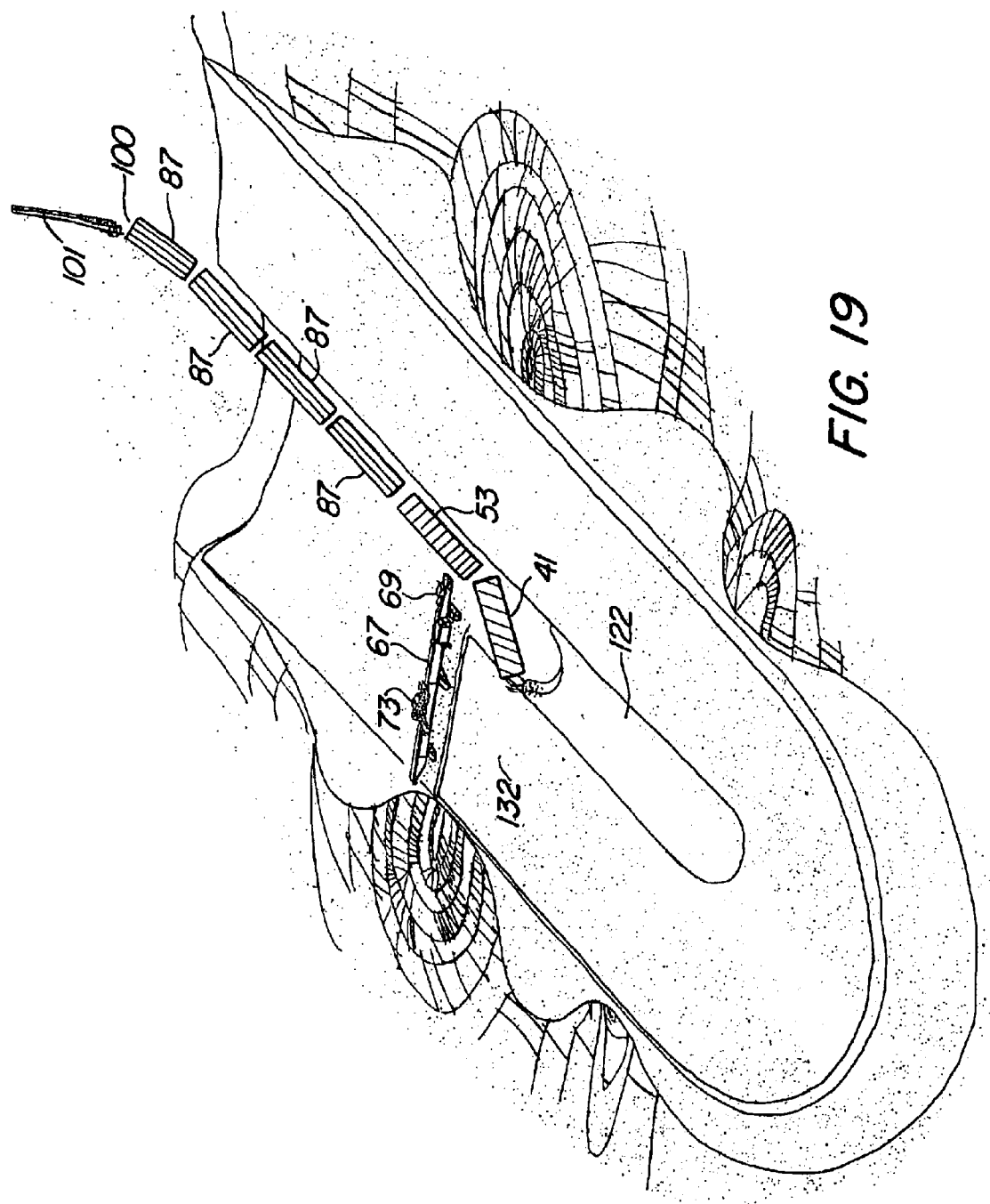
FIG. 19 is an isometric illustration indicating the disposition of stacking system components and the area topography during the retraction phase with a radial stacker filling in the corridor to lift grade elevation.

FIG. 19 illustrates continued retraction of bridge stacker 67 towards the supply point 100. Radial stacker 41 continues to fill corridor 122 as the second lift retraction cycle continues. The mobile conveyor modules 87 continue to be removed as they are no longer needed.

Figure 20:
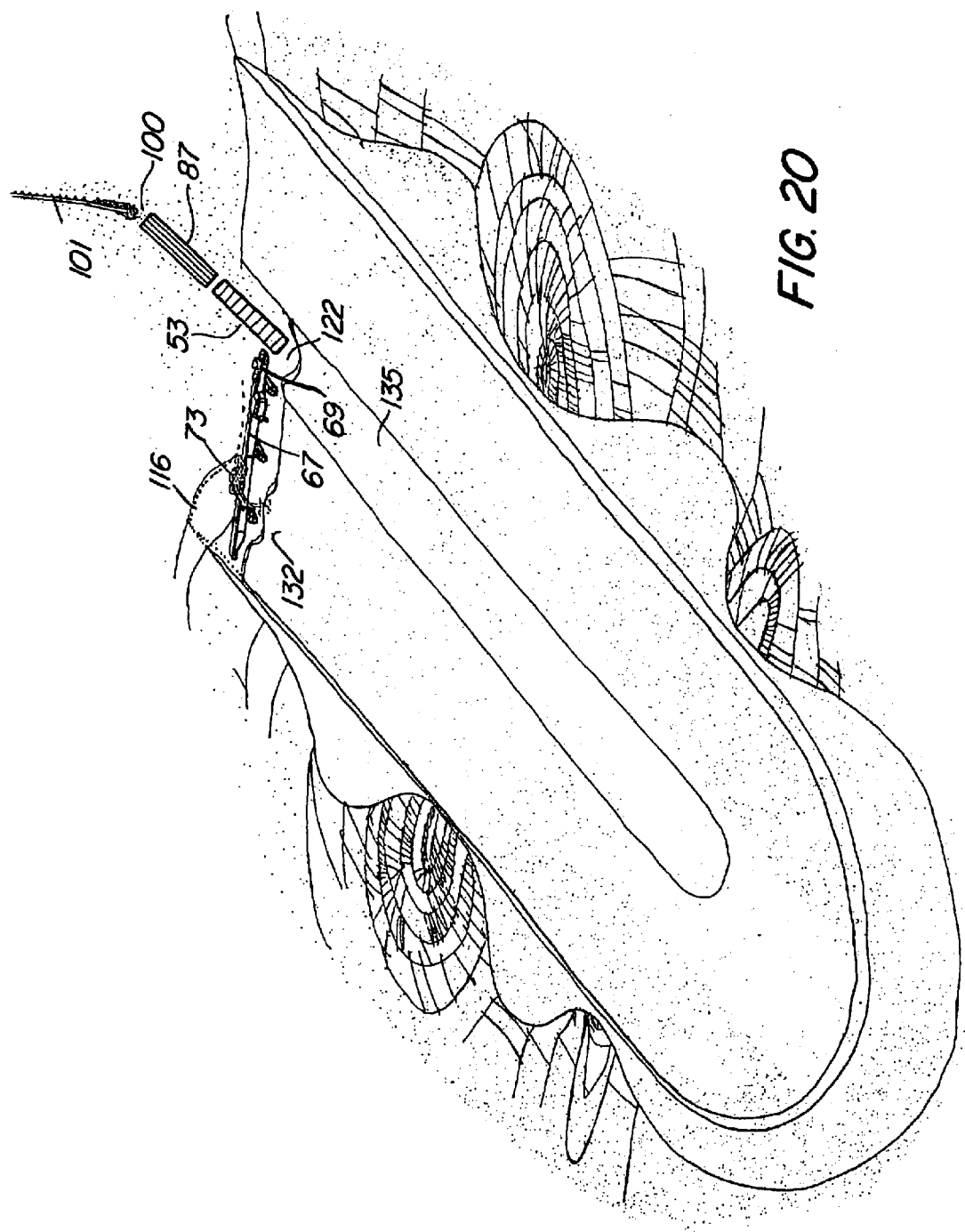
FIG. 20 is an isometric illustration indicating the disposition of stacking system components on an area topography when the second lift cycle is completed and the grade elevation is being tapered out against the topographic slope.

FIG. 20 illustrates the placement of the stacking system components on the area of topography when the second lift cycle is being completed by tapering the current lift level 132 out against the topographic slope contour 116 on the material supply side. At this point, only one mobile belt conveyor module 87 is needed to feed tripper module 53, which feeds bridge stacker 67. Bridge stacker 67 is shown as travelling in front of a newly stacked lift 132 and about to pass over the contour 116 on to the topographical slope nearest the material supply point 100, thereby completing the second lift cycle.

The complete process for applying two lifts has been illustrated. It should be kept in mind that more than two lifts are contemplated and are well within the capability of the stacking system components of the present invention. Only two lifts have been illustrated because it was felt this was sufficient to show the smooth and swift stacking sequence obtainable by the present invention. Moreover, although only retreat stacking and advance stacking modes have been shown used separately, the present invention contemplates use of both modes together.

Figure 21:
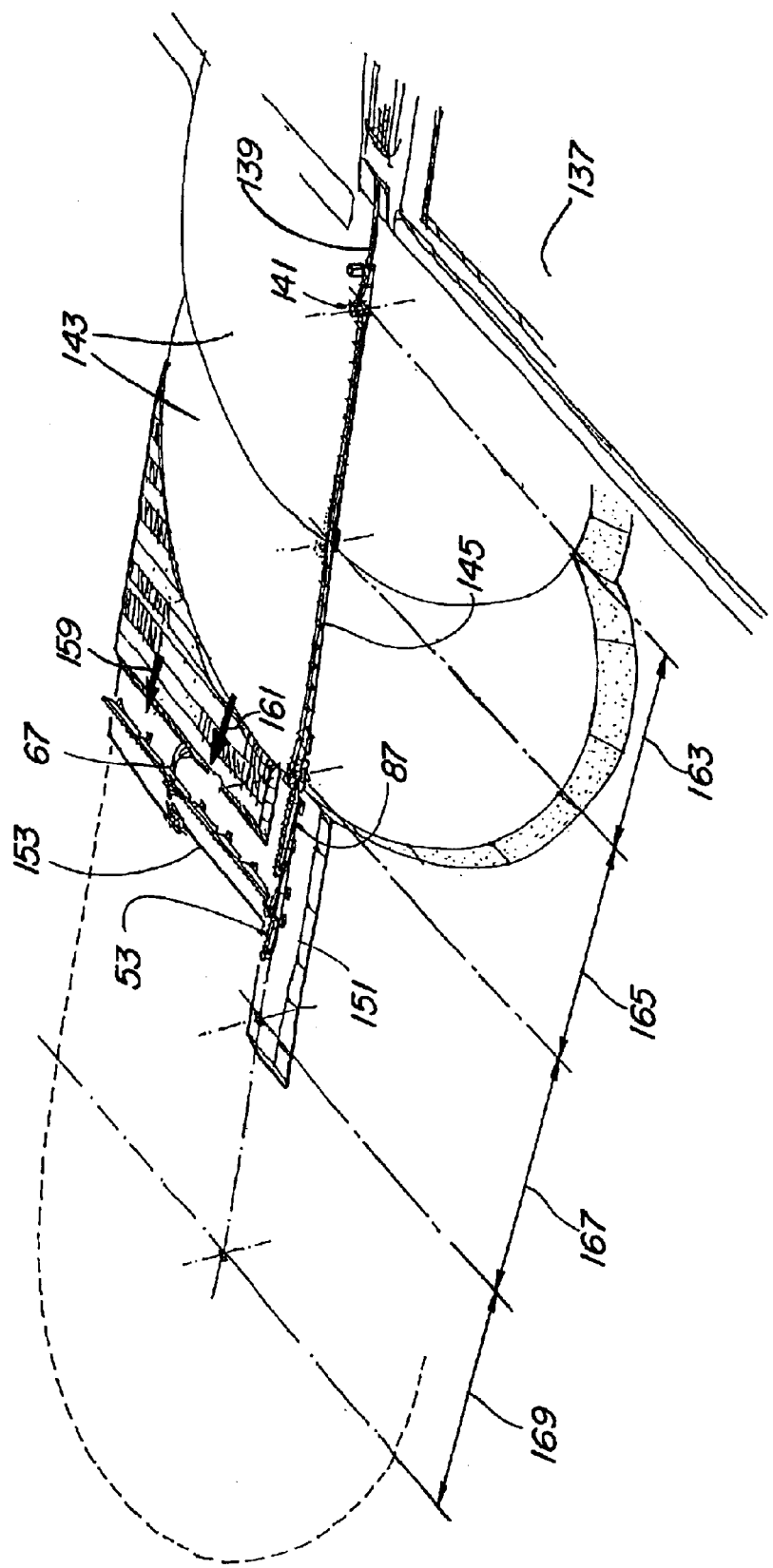
FIG. 21 is a schematic illustration of a stacking layout for a dump site showing disposition of the stacking system components during the extension phase of a lift cycle.

Referring now to FIG. 21, a system and method according to the present invention of stacking aggregate on a dump is illustrated. A transfer or reclaim conveyor 139 conveys the aggregate to be dump stacked from an on/off pad 137, for example, to a transfer point 141 where it is transferred to a conventional extendible conveyor 145. FIG. 21 illustrates a pair of radially stacked areas 143, each with a 220 meter radius 163 and 165, which were radially stacked by a bridge stacker in a manner well known in the art.

FIG. 21 shows that after the 440 meter mark, the system and method of the present invention is utilized to finish stacking the dump site. At the end of the 440 meter mark, the end of the extendible conveyor 145 and second section 165, the aggregate is transferred to a mobile belt conveyor module 87. The mobile belt conveyor module transfers it's aggregate to a mobile tripper module 53. Tripper module 53 supplies the aggregate to a bridge stacker 67 that stacks the aggregate to a first lift level 153 in front, in an advance stacking mode, and also stacks the aggregate behind in a retreat stack stacking mode. The bridge stacker 153 is shown advancing in the direction shown by arrows 161 in the extension phase of the dual lift stacking cycle.

The berm 151 on which tripper module 53 travels must be at the same level as the first lift 153. This berm can be created by utilizing a berm stacker (not shown) or by truck hauled aggregate.

Figure 22:
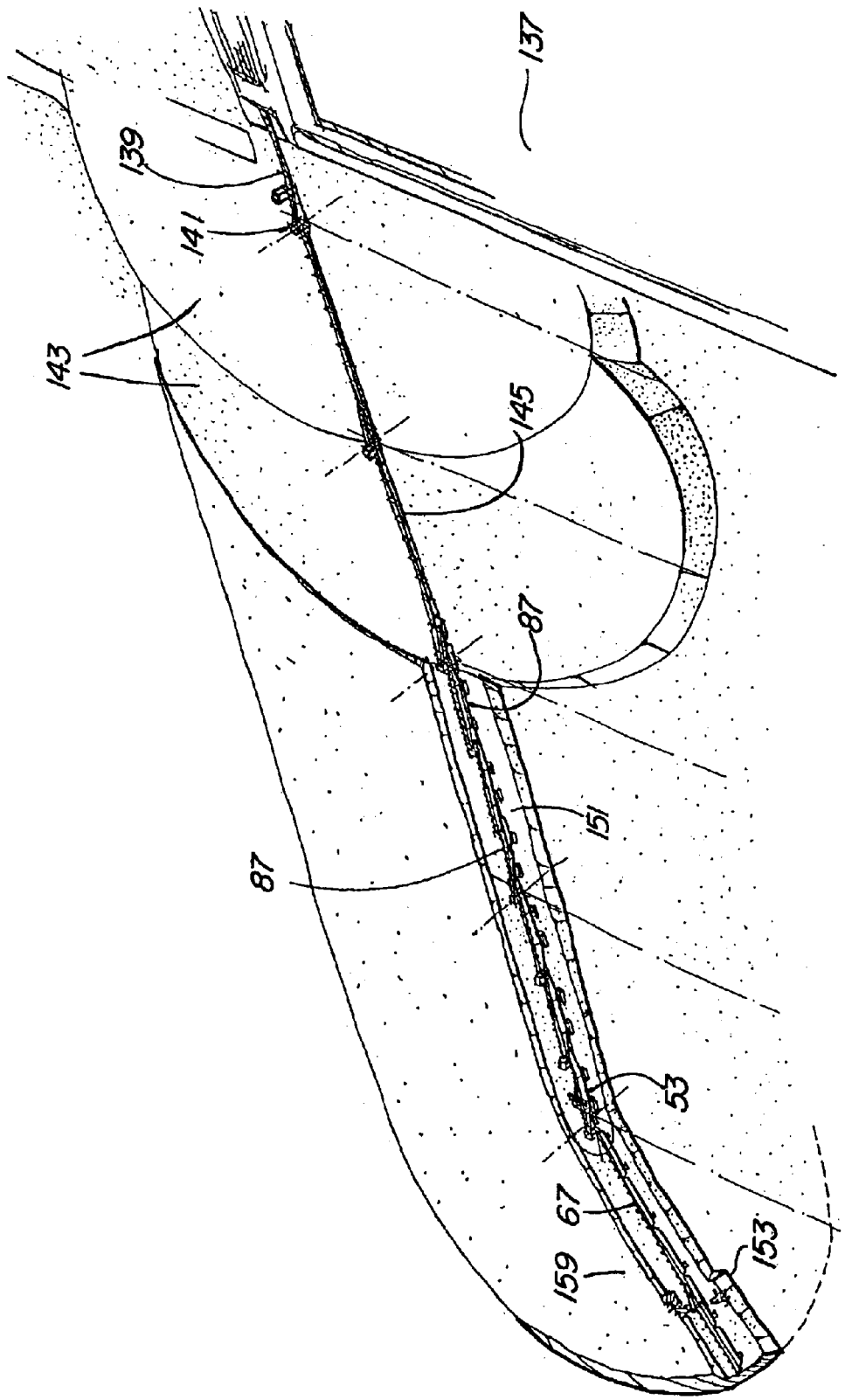
FIG. 22 is a schematic illustration showing the disposition of stacking system components on a dump site when stacking has reached the end of the area furthest away from the material supply and the stacking bridge is being rotated and translated around the end of the area to prepare to begin retraction.

FIG. 22 illustrates the end of the extension cycle wherein the system of the present invention is utilizing the maximum number of mobile belt conveyor modules 87 needed to feed tripper module 53, which feeds bridge stacker 67 that is traversing the end area in an arc to form the curved end of the first dual lift. Bridge stacker 67 continues to stack in the advance and retreat mode depositing aggregate 153 in front of it's path and aggregate 159 behind it, thereby effectively creating two lifts in one pass.

Figure 23:
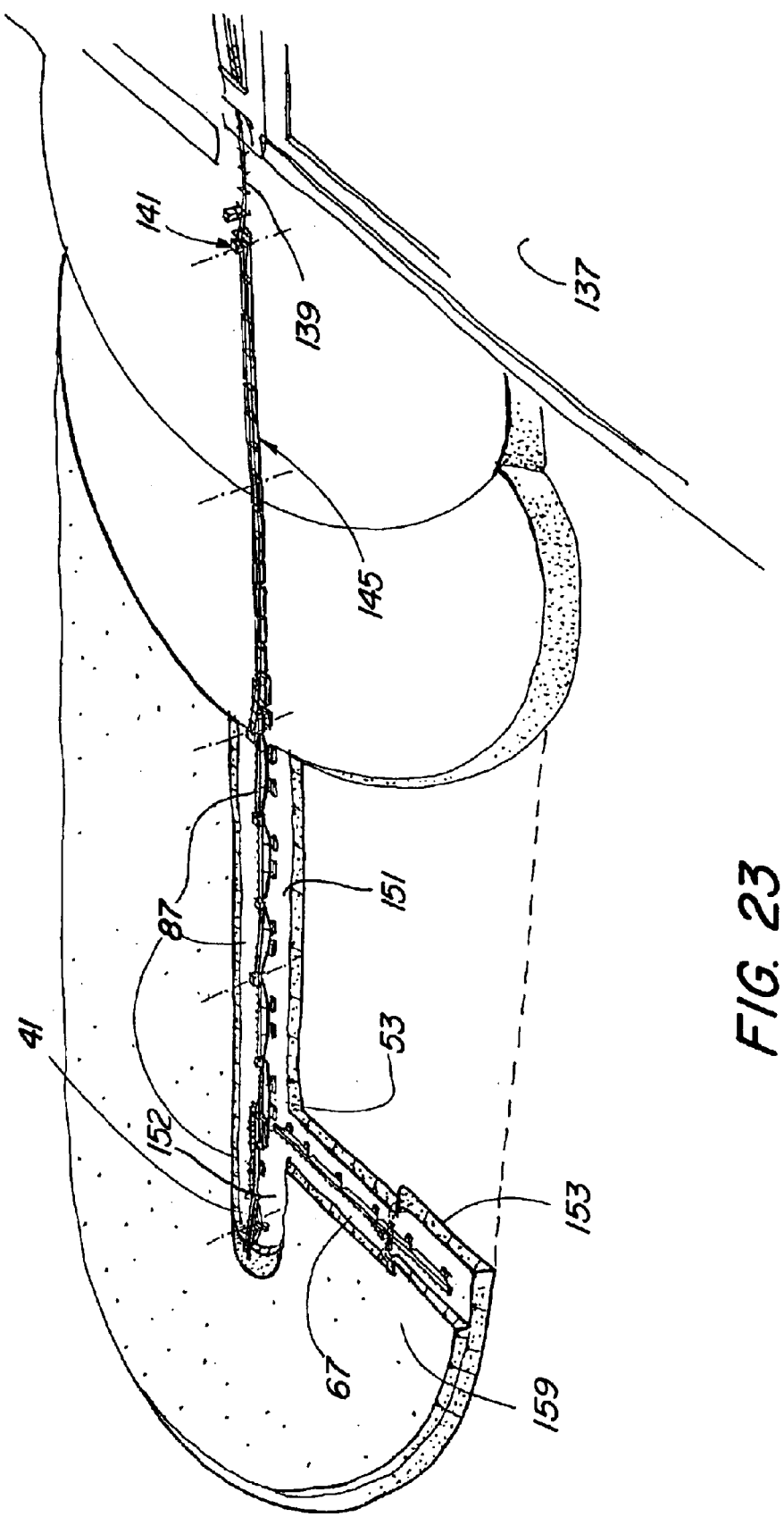
FIG. 23 is a schematic illustration showing the disposition of stacking system components on a dump site during retraction.

FIG. 23 illustrates the bridge stacker 67 in the extraction phase of the dual lift cycle. Bridge stacker 67 continues to stack material 153 in front and material 159 in back as it travels toward the transfer point 141. The mobile belt conveyor modules 87 that feed tripper 53 are removed as they are not needed. Tripper module 53, besides feeding bridge stacker 67, is now also feeding another mobile belt conveyor module 87 that in turn feeds a radial stacker 41. Radial stacker 41 lags behind bridge stacker 67 as it fills in newly created corridor 152.

Figure 24:
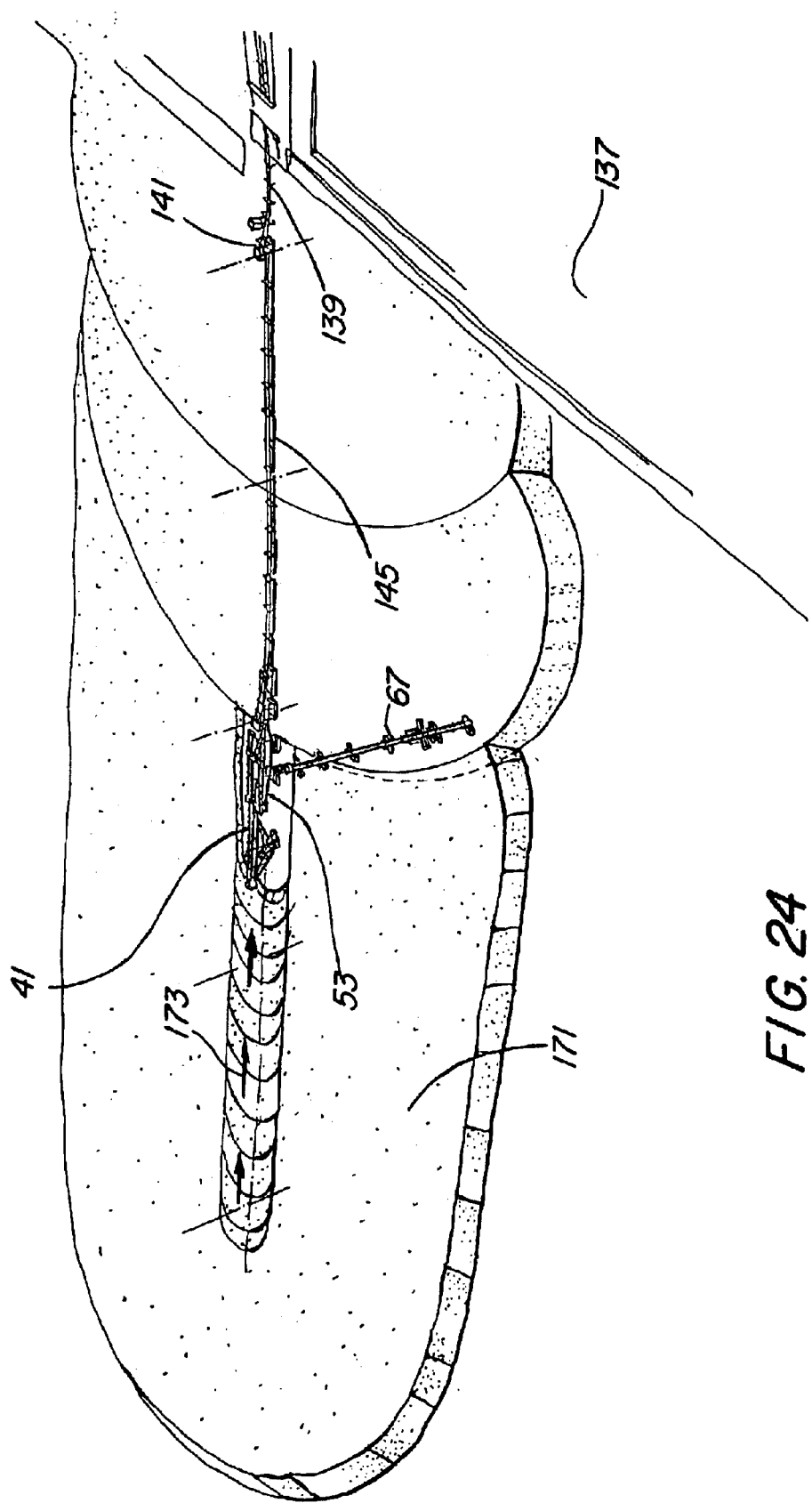
FIG. 24 is a schematic illustration showing the disposition of stacking system components on a dump site at about completion of the retraction phase with a radial stacker stacking the corridor.

FIG. 24 shows the position of the system components of the present invention at the completion of the stacking cycle of bridge stacker 67. At this point, although the stack has been completed to lift level 171, the corridor 152 still needs to be stacked. Tripper module 53 supplies the aggregate to a radial stacker 41 to stack corridor 152 as it is being retracted in direction 173.

Figure 25:
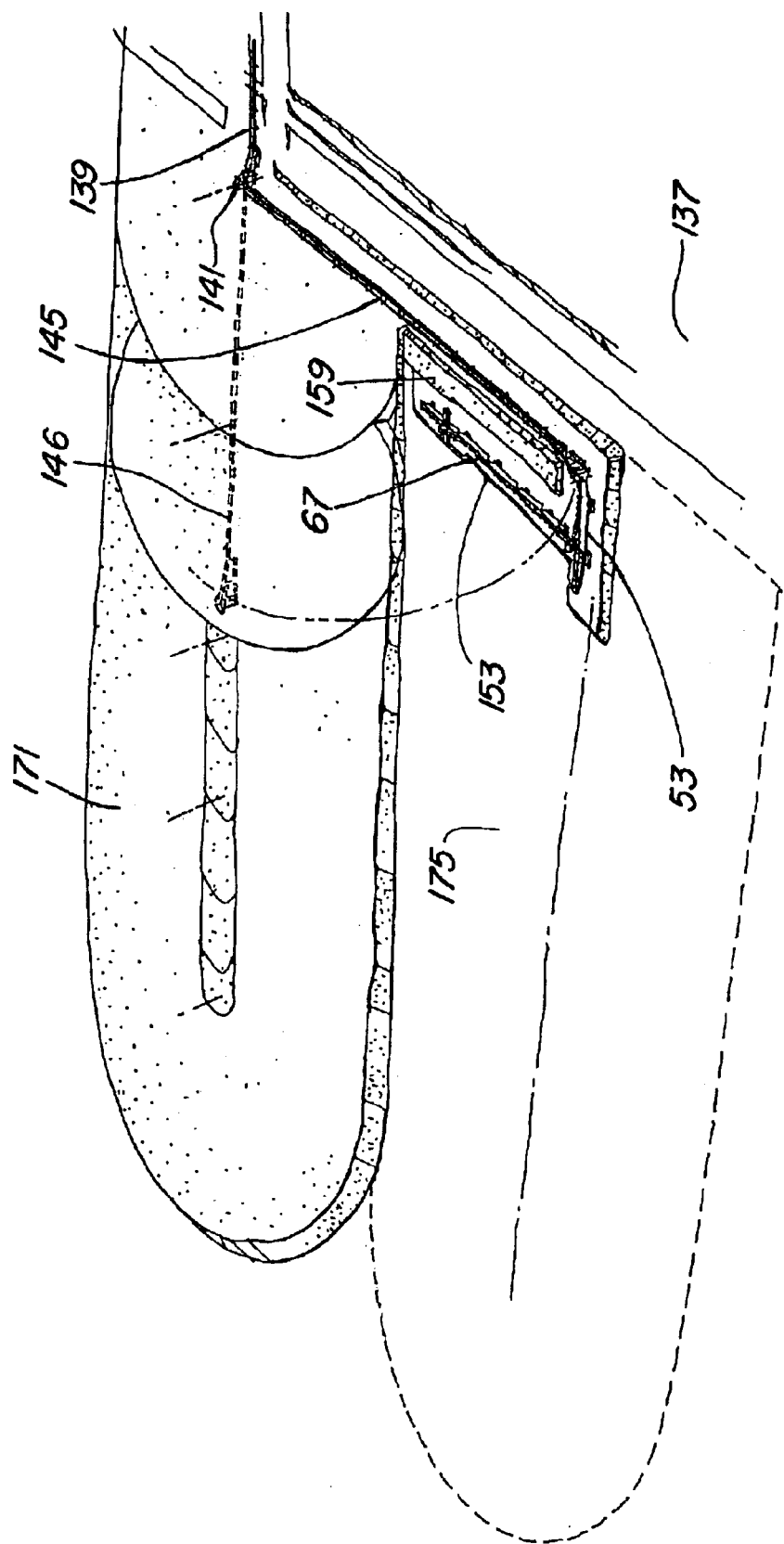
FIG. 25 is a schematic illustration showing the relocation of the stacking system components to an adjacent dump site.

Once this first pad has been stacked to lift level 171, the extendible conveyor 145 is moved from transfer point 141 to a second stack area 175 (FIG. 25) for a second phase of stacking. A bridge tripper 53 located in this second area 175 feeds relocated bridge stacker 67, which is again operating in both a retreat and advance stacking mode, stacking aggregate 153 in front and aggregate 159 in back at the same time. Extendible conveyor 145 was moved to the position shown from it's initial position shown in phantom lines 146. Bridge stacker 67 likewise is moved to it's new starting position on the second dump stack 175. The second dump stack 175 is completed in the same manner as described above for the first dump stack 171.

Figure 26:
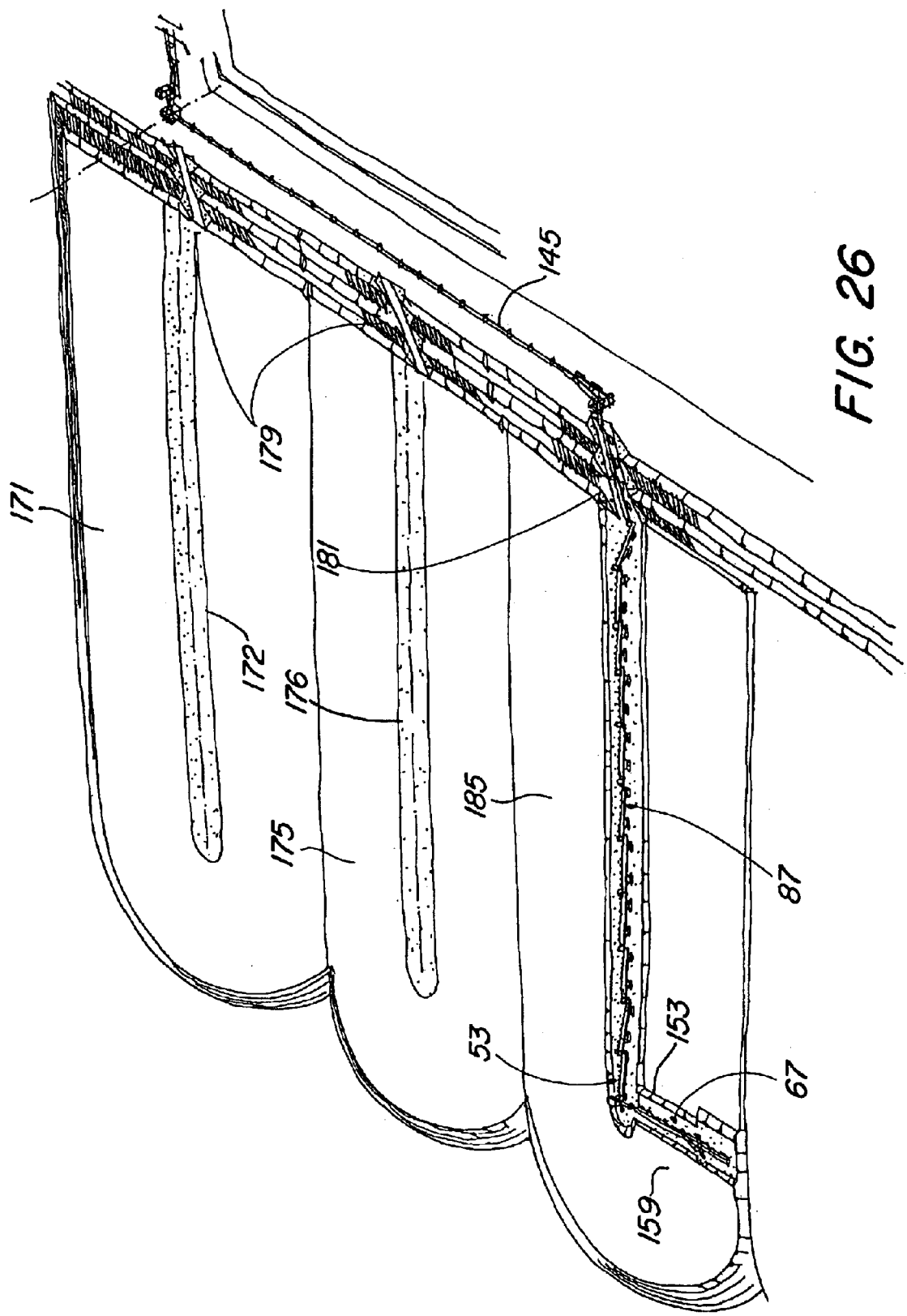
FIG. 26 is a schematic illustration showing disposition of the stacking system components in the retraction phase of a multiple lift stacking cycle on a third adjacent dump site.

FIG. 26 illustrates the placement of the system components on a third dump stack 185 while constructing a third dual lift. The extendible conveyor 145 has been relocated to the third dump stack area 185. In order to get to the lift level, equipment ramps 179 were cut into the first and second dump stacks 171 and 175. Equipment ramp 181 is cut into the third dump stack 185. Each of these ramps are approximately at 12 degree lift or a 22.25% slope.

The mobile belt conveyor modules 87 of the present invention traverse this ramp 181 from the discharge point of the extendible conveyor 145 all the way to the tripper module 53. Tripper module 53 feeds bridge stacker 67 which stacks in a retreat and advance mode. The corridor being built during the retraction phase shown will be stacked in the same manner as explained above in connection with FIG. 24.

Although only two or three lifts have been shown for purposes of keeping the explanation as short as possible, it should be remembered that the system components of the present invention are capable of stacking many more lifts.

What is claimed is:

1. A mobile conveyor system for stacking aggregate comprising:
   a mobile belt conveyor module mounted for movement with respect to the ground on steerable rolling stock;
   a mobile tripper module mounted for movement with respect to the ground on steerable rolling stock, the tripper module being fed aggregate by the mobile belt conveyor module and discharging aggregate laterally on one of either side of the mobile tripper module via a reversible tripper car; and
   a stacker receiving aggregate from the tripper module and stacking the aggregate to lift level.

2. The mobile conveyor system of claim 1, further comprising:
   a second mobile belt conveyor module mounted for movement with respect to the ground on steerable rolling stock, the second mobile belt conveyor module receiving aggregate from the tripper conveyor module and feeing aggregate to the stacker.

3. The mobile conveyor system of claim 1 wherein said mobile belt conveyor module comprises:
   a span of a certain length;
   a receiving hopper at one end of the span;
   a discharge chute at the other end of the span; and
   crawler tracks supporting the span, the crawler tracks being steerable.

4. The mobile conveyor system of claim 3 wherein the crawler tracks are steerable through one hundred and eighty degrees.

5. The mobile conveyor system of claim 4 wherein the mobile belt conveyor module is about two hundred and fifty feet from receiving hopper to discharge chute.

6. The mobile conveyor system of claim 3 further comprising a power unit for driving the crawler tracks.

7. The mobile conveyor system of claim 1 wherein said mobile tripper module comprises:
   a span of a certain length;
   a receiving hopper at one end of the span;
   a discharge chute at the other end of the span; and
   crawler tracks supporting the span, the crawler tracks being steerable.

8. The mobile conveyor system of claim 7 wherein the crawler tracks are steerable through one hundred and eighty degrees.

9. The mobile conveyor system of claim 8 wherein the mobile tripper module is about three hundred feet from the receiving hopper to the discharge chute.

10. The mobile conveyor system for stacking aggregate, comprising:
    a mobile tripper module mounted for movement with respect to the ground on steerable rolling stock, the mobile tripper module for discharging aggregate laterally on one of either side of the mobile tripper module via a reversible tripper car;

a stacker being fed aggregate by the mobile tripper module; and a bridge stacker mounted for movement with respect to the ground, the bridge stacker being fed aggregate by the mobile tripper module.

11. The mobile conveyor system of claim 10, further comprising:

a mobile belt conveyor module mounted for movement with respect to the ground on steerable rolling stock, the mobile belt conveyor module feeding aggregate to the mobile tripper module.

12. The mobile conveyor system of claim 11 wherein said mobile belt conveyor module comprises:

a span of a certain length;

a receiving hopper at one end of the span;

a discharge chute at the other end of the span; and crawler tracks supporting the span, the crawler tracks being steerable.

13. The mobile conveyor system of claim 12 wherein the crawler tracks are steerable through one hundred and eighty degrees.

14. The mobile conveyor system of claim 13 wherein the mobile belt conveyor module is about two hundred and fifty feet from receiving hopper to discharge chute.

15. The mobile conveyor system of claim 12 further comprising a power unit for driving the crawler tracks.

16. The mobile conveyor system of claim 10 wherein the mobile tripper module comprises:

a span of a certain length;

a receiving hopper at one end of the span;

a discharge chute at the other end of the span; and crawler tracks supporting the span, the crawler tracks being steerable.

17. The mobile conveyor system of claim 16 wherein the crawler tracks are steerable through one hundred and eighty degrees.

18. The mobile conveyor system of claim 17 wherein the mobile tripper module is about three hundred feet from the receiving hopper to the discharge chute.

19. A mobile conveyor system for stacking aggregate comprising:

a mobile tripper module mounted for movement with respect to the ground on steerable rolling stock and discharging substrate laterally on one of either side of the mobile tripper module via a reversible tripper car;

a bridge stacker aligned with respect to the mobile tripper module to receive aggregate from the tripper module; and a first mobile belt conveyor module mounted for movement with respect to the ground on steerable rolling stock, the first mobile belt conveyor module feeding aggregate to the mobile tripper module.

20. The mobile conveyor system of claim 19 further comprising a plurality of mobile belt conveyor modules mounted for movement with respect to the ground on steerable rolling stock, the plurality of belt conveyor modules aligned to feed aggregate along their length to the next succeeding belt conveyor module and to the first mobile belt conveyor module.

21. The mobile conveyor system of claim 19 further comprising:

a second mobile belt conveyor module mounted for movement with respect to the ground on steerable rolling stock, the second mobile belt conveyor module receiving aggregate from the mobile tripper module; and a stacker being fed aggregate by the second mobile belt conveyor module.

22. The mobile conveyor system of claim 21 further comprising a plurality of mobile belt conveyor modules mounted for movement with respect to the ground on steerable rolling stock, the plurality of belt conveyor modules aligned to feed aggregate along their length to the next succeeding belt conveyor module and to the first mobile belt conveyor module.

23. The mobile conveyor system of claim 21 wherein each one of the mobile belt conveyor modules comprises:

a span of a certain length;

a receiving hopper at one end of the span;

a discharge chute at the other end of the span; and crawler tracks supporting the span, the crawler tracks being steerable.

24. The mobile conveyor system of claim 23 wherein the crawler tracks are steerable through one hundred and eighty degrees.

25. The mobile conveyor system of claim 24 wherein each mobile belt conveyor module is about two hundred and fifty feet from receiving hopper to discharge chute.

26. The mobile conveyor system of claim 25 wherein each mobile belt conveyor further comprises a power unit for driving the crawler tracks.

27. The mobile belt conveyor system of claim 26 wherein said mobile tripper module comprises:

a span of a certain length;

a receiving hopper at one end of the span;

a discharge chute at the other end of the span; and crawler tracks supporting the span, the crawler tracks being steerable.

28. The mobile conveyor system of claim 27 wherein the crawler tracks of the mobile tripper module are steerable through one hundred and eighty degrees.

29. The mobile conveyor system of claim 28 wherein the mobile tripper module is about three hundred feet from receiving hopper to the discharge chute.

30. A mobile conveyor system for stacking aggregate, comprising:

a mobile belt conveyor module for receiving aggregate, the mobile conveyor module having a truss structure mounted for movement with respect to the ground on a first pair of steerable rolling stock, each element of the first pair of steerable rolling stock being disposed each toward one end of the truss structure;

a mobile tripper module having a truss structure mounted for movement with respect to the ground on a second pair of steerable rolling stock, each element of the second pair of steerable rolling stock being disposed each toward one end of the truss structure, the mobile tripper module receiving aggregate from the mobile belt conveyor module and discharging aggregate laterally on one of either side of the mobile tripper module via a reversible tripper car; and a bridge stacker aligned with respect to the mobile tripper module, the bridge stacker being fed aggregate by the mobile tripper module.

31. The mobile conveyor system of claim 30, wherein the rolling stock is one of wheels and crawler tracks.

32. The mobile conveyor system of claim 30, wherein the rolling stock are steerable through about 180 degrees and driveable through 360 degrees.

33. The mobile conveyor system of claim 30, wherein the mobile tripper module discharges aggregate laterally to one of either side of the mobile tripper module using a reversible tripper car that is longitudinally movable along the truss structure.

* * * * *